(12) United States Patent
Aoki et al.

(10) Patent No.: US 12,433,777 B2
(45) Date of Patent: Oct. 7, 2025

(54) KNEE BRACE AND LEG BRACE

(71) Applicant: TOYOTA JIDOSHA KABUSHIKI KAISHA, Toyota (JP)

(72) Inventors: Eisuke Aoki, Toyota (JP); Tadashi Odashima, Toyota (JP); Takahiro Takeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 913 days.

(21) Appl. No.: 17/668,020

(22) Filed: Feb. 9, 2022

(65) Prior Publication Data

US 2022/0257403 A1    Aug. 18, 2022

(30) Foreign Application Priority Data

Feb. 15, 2021    (JP) ................................. 2021-021467

(51) Int. Cl.
*A61F 5/01*    (2006.01)

(52) U.S. Cl.
CPC .... *A61F 5/0123* (2013.01); *A61F 2005/0155* (2013.01)

(58) Field of Classification Search
CPC .... A61F 5/0123; A61F 5/0102; A61F 5/0106; A61F 5/0125; A61F 2005/0137; A61F 2005/0141; A61F 2005/0165; A61F 2005/0146; A61F 2005/0172; A61F 2005/0176; A61F 2005/0155; A43C 11/165

USPC ................. 602/26, 5, 22.11, 23, 16
See application file for complete search history.

(56) References Cited

U.S. PATENT DOCUMENTS

| | | | | |
|---|---|---|---|---|
| 1,390,915 | A | * | 9/1921 | Julius ..................... A61F 2/646 16/275 |
| 4,890,607 | A | * | 1/1990 | Townsend ............. A61F 5/0123 602/26 |
| 5,107,824 | A | | 4/1992 | Rogers et al. |
| 5,168,865 | A | | 12/1992 | Radcliffe et al. |
| 5,611,774 | A | * | 3/1997 | Postelmans .......... A61F 5/0123 602/26 |
| 6,010,474 | A | * | 1/2000 | Wycoki ................ A61F 5/0102 602/26 |
| 2004/0002674 | A1 | | 1/2004 | Sterling |
| 2006/0089581 | A1 | * | 4/2006 | Lambert ............... A61F 5/0123 602/26 |

(Continued)

FOREIGN PATENT DOCUMENTS

| | | |
|---|---|---|
| JP | H05029707 Y2 | 7/1993 |
| WO | 2012/098733 A1 | 7/2012 |

*Primary Examiner* — Alireza Nia
*Assistant Examiner* — Michael Milo
(74) *Attorney, Agent, or Firm* — Dinsmore & Shohl LLP

(57) ABSTRACT

A shank outer link moves away from a thigh outer link in the longitudinal direction of the shank outer link and the shank outer link is drawn forward in a direction perpendicular to the longitudinal direction of the shank outer link relative to the thigh outer link as a knee joint of a user is extended. A shank inner link moves away from a thigh inner link in the longitudinal direction of the shank inner link and the shank inner link is drawn forward in the direction perpendicular to the longitudinal direction of the shank inner link relative to the thigh inner link as the knee joint of the user is extended.

13 Claims, 19 Drawing Sheets

(56) References Cited

U.S. PATENT DOCUMENTS

2013/0289458 A1\* 10/2013 Okada .................. A61F 5/0102
602/16

\* cited by examiner

KNEE BRACE AND LEG BRACE

CROSS REFERENCE TO RELATED APPLICATIONS

This application is based upon and claims the benefit of priority from Japanese patent application No. 2021-21467, filed on Feb. 15, 2021, the disclosure of which is incorporated herein in its entirety by reference.

BACKGROUND

The present disclosure relates to a knee brace and a leg brace.

Patent Literature 1 (Japanese Utility Model No. H05-29707) discloses a knee brace that includes a structure including parts from a thigh part to a shank part and prevents a knee joint from being deformed by controlling movement of the knee joint.

SUMMARY

Incidentally, diseased legs with knee osteoarthritis often have knee joint flexion contracture. Knee joint flexion contracture has a symptom that the range of motion of a knee joint on an extension side is narrow, which results in a pain being caused in the knee joint when it is extended.

FIG. 1 shows a side view of a normal knee joint. As shown in FIG. 1, the femoral condyle of the femur and the upper joint surface of the shinbone are vertically opposed to each other. In FIG. 1, "forward" means forward with respect to a patient and "rearward" means rearward with respect to the patient.

FIG. 2 shows a side view of a knee joint with knee joint flexion contracture. As shown in FIG. 2, when the knee joint has knee joint flexion contracture, the upper joint surface of the shinbone is displaced relatively rearward with respect to the femoral condyle of the femur. When the knee joint is extended in this state, an appropriate sliding between the upper joint surface of the shinbone and the femoral condyle of the femur is inhibited, which results in a pain being caused in the knee joint. Mainly due to the pain that occurs when the knee joint is extended, rehabilitation aimed at expanding the movable range of the knee joint on the extension side has been unendurable for patients.

The aim of the present disclosure is to provide a technique for relieving pain that occurs when a knee joint with knee joint flexion contracture is extended.

According to an aspect of the present disclosure, a knee brace including: a thigh attachment part that is attached to a thigh of a user; a shank attachment part that is attached to a shank of the user; an outer unit that couples the thigh attachment part to the shank attachment part and is arranged on an outer (lateral) side of a lower limb of the user; and an inner unit that couples the thigh attachment part to the shank attachment part and is arranged on an inner (medial) side of the lower limb of the user, in which the outer unit includes: a thigh outer link that is extended along the thigh and is fixed to the thigh by the thigh attachment part; and a shank outer link that is extended along the shank and is fixed to the shank by the shank attachment part, the thigh outer link and the shank outer link are rotatably coupled to each other on the outer side of the knee joint of the user, the inner unit includes: a thigh inner link that is extended along the thigh and is fixed to the thigh by the thigh attachment part; and a shank inner link that is extended along the shank and is fixed to the shank by the shank attachment part, and the thigh inner link and the shank inner link are rotatably coupled to each other on the inner side of the knee joint of the user, and the outer unit and the inner unit are configured in such a way that the shank outer link moves away from the thigh outer link in the longitudinal direction of the shank outer link and the shank outer link is drawn forward in the direction perpendicular to the longitudinal direction of the shank outer link relative to the thigh outer link, and the shank inner link moves away from the thigh inner link in the longitudinal direction of the shank inner link and the shank inner link is drawn forward in the direction perpendicular to the longitudinal direction of the shank inner link relative to the thigh inner link as the knee joint of the user extended is provided. According to the aforementioned structure, it is possible to relieve pain that occurs when a knee joint with knee joint flexion contracture is extended.

A thigh cam may be formed in the thigh outer link, a shank pin that is engaged with the thigh cam in such a way that the shank pin moves along the thigh cam may be formed in the shank outer link, a shank cam may be formed in the shank outer link, a thigh pin that is engaged with the shank cam in such a way that the thigh pin moves along the shank cam may be formed in the thigh outer link, and the shank cam may be extended rearward as it moves away from the shank attachment part, and the thigh cam may be formed in such a way that the shank attachment part moves away from the thigh pin as the knee joint is extended. According to the aforementioned structure, the relative movement of the shank outer link with respect to the thigh outer link described above is achieved with a simple structure.

A thigh cam may be formed in the thigh inner link, a shank pin that is engaged with the thigh cam in such a way that the shank pin moves along the thigh cam may be formed in the shank inner link, a shank cam may be formed in the shank inner link, a thigh pin that is engaged with the shank cam in such a way that the thigh pin moves along the shank cam may be formed in the thigh inner link, the shank cam may be extended rearward as it moves away from the shank attachment part, and the thigh cam may be formed in such a way that the shank attachment part moves away from the thigh pin as the knee joint is extended. According to the aforementioned structure, the relative movement of the shank outer link with respect to the thigh outer link described above is achieved with a simple structure.

When it is defined that the knee joint angle when the knee joint is in an extended state is 0 degrees and the knee joint angle increases as the knee joint is flexed, the thigh cam may be formed in such a way that the shank attachment part moves away from the thigh pin while the knee joint angle is changed from 90 degrees to 0 degrees. According to the aforementioned structure, it is possible to efficiently relieve the pain at a timing when the pain occurs when the knee joint with knee joint flexion contracture is extended.

The thigh cam may be formed in such a way that the shank attachment part moves away from the thigh pin while the knee joint angle is changed from 60 degrees to 30 degrees. According to the aforementioned structure, it is possible to efficiently relieve the pain at a timing when the pain occurs when the knee joint with knee joint flexion contracture is extended.

A thigh cam may be formed in the thigh outer link, a shank pin that is engaged with the thigh cam in such a way that the shank pin moves along the thigh cam may be formed in the shank outer link, a shank cam may be formed in the shank outer link, a thigh pin that is engaged with the shank cam in such a way that the thigh pin moves along the shank cam may be formed in the thigh outer link, and the thigh cam may be extended forward as it moves away from the thigh attachment part, and the shank cam may be formed in such a way that the shank attachment part moves away from the thigh pin as the knee joint is extended. According to the aforementioned structure, the relative movement of the shank outer link with respect to the thigh outer link described above is achieved with a simple structure.

A thigh cam may be formed in the thigh inner link, a shank pin that is engaged with the thigh cam in such a way that the shank pin moves along the thigh cam may be formed in the shank inner link, a shank cam may be formed in the shank inner link, a thigh pin that is engaged with the shank cam in such a way that the thigh pin moves along the shank cam may be formed in the thigh inner link, the thigh cam may be extended forward as it moves away from the thigh attachment part, and the shank cam may be formed in such a way that the shank attachment part moves away from the thigh pin as the knee joint is extended. According to the aforementioned structure, the relative movement of the shank outer link with respect to the thigh outer link described above is achieved with a simple structure.

When it is defined that the knee joint angle when the knee joint is in an extended state is 0 degrees and the knee joint angle increases as the knee joint is flexed, the shank cam may be formed in such a way that the shank attachment part moves away from the thigh pin while the knee joint angle is changed from 90 degrees to 0 degrees. According to the aforementioned structure, it is possible to efficiently relieve the pain at a timing when the pain occurs when the knee joint with knee joint flexion contracture is extended.

The shank cam may be formed in such a way that the shank attachment part moves away from the thigh pin while the knee joint angle is changed from 60 degrees to 30 degrees. According to the aforementioned structure, it is possible to efficiently relieve the pain at a timing when the pain occurs when the knee joint with knee joint flexion contracture is extended.

A leg brace including the above knee brace may be provided.

According to the present disclosure, it is possible to relieve pain that occurs when a knee joint with knee joint flexion contracture is extended.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
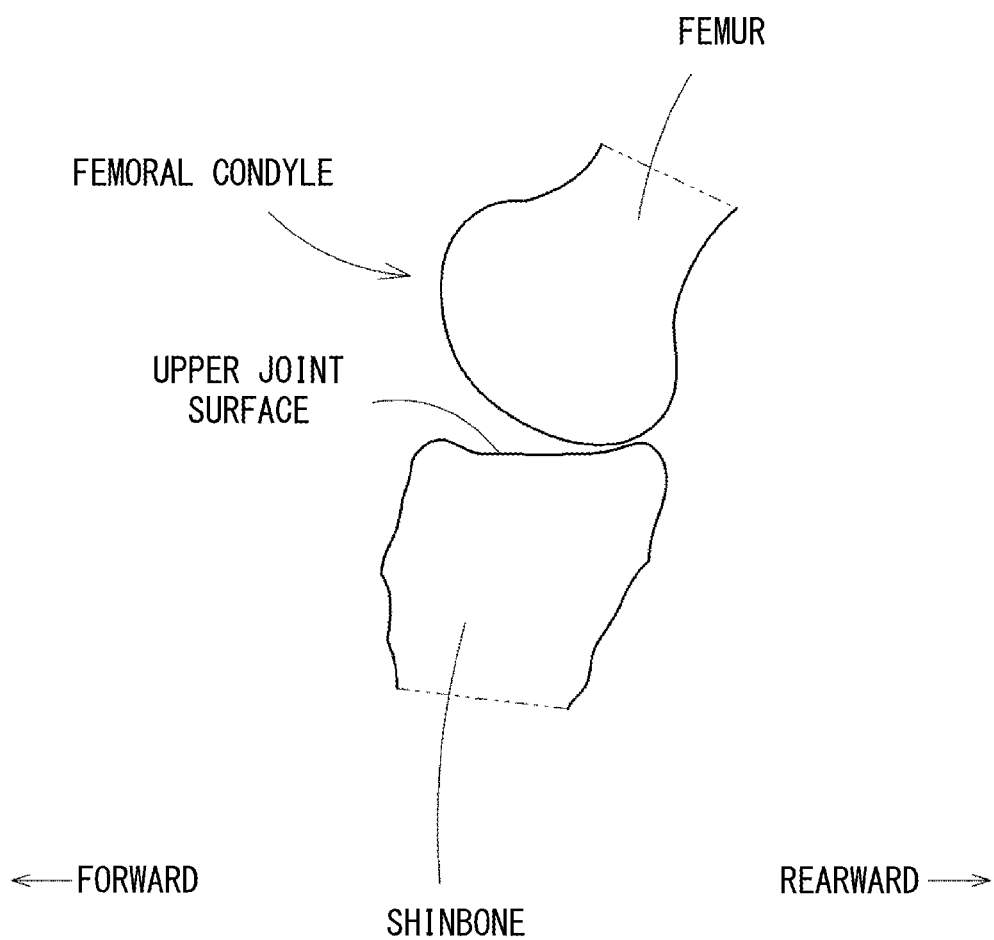
FIG. 1 is a side view of a normal knee joint.
Figure 2:
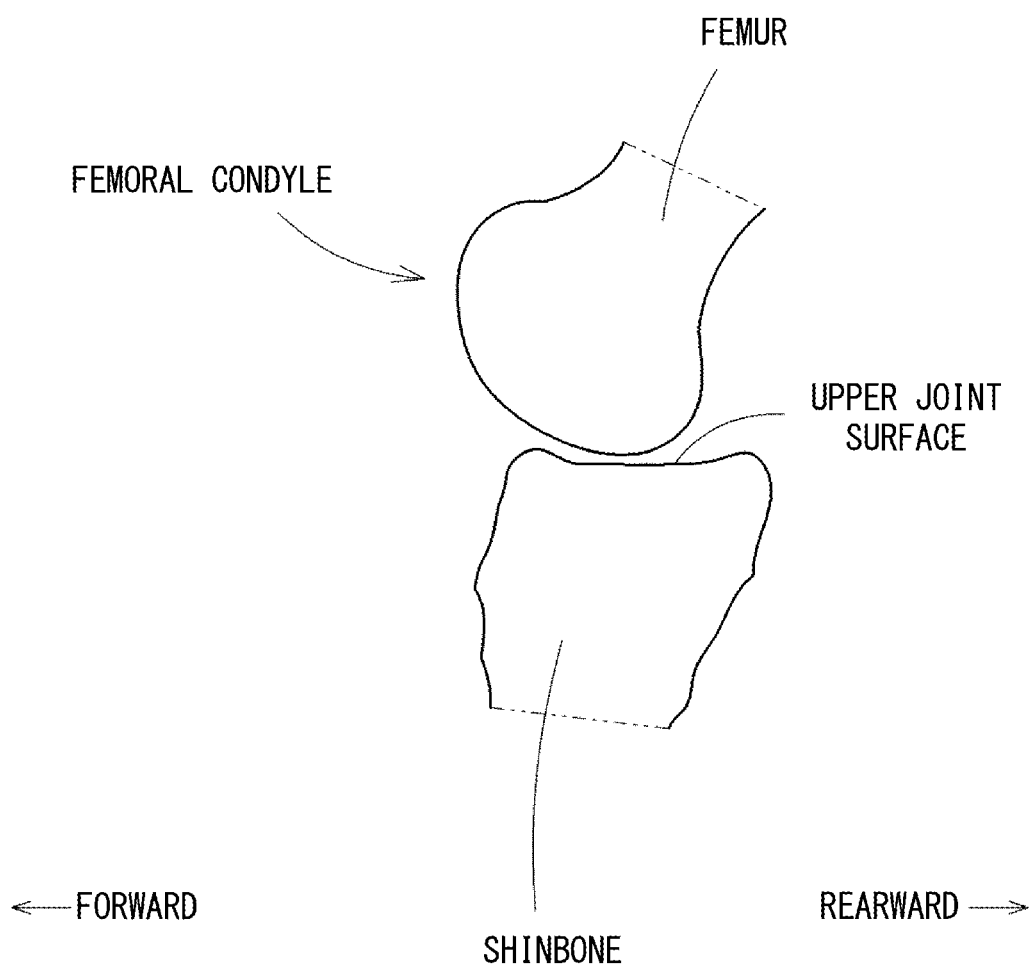
FIG. 2 is a side view of a knee joint with knee joint flexion contracture.
Figure 3:
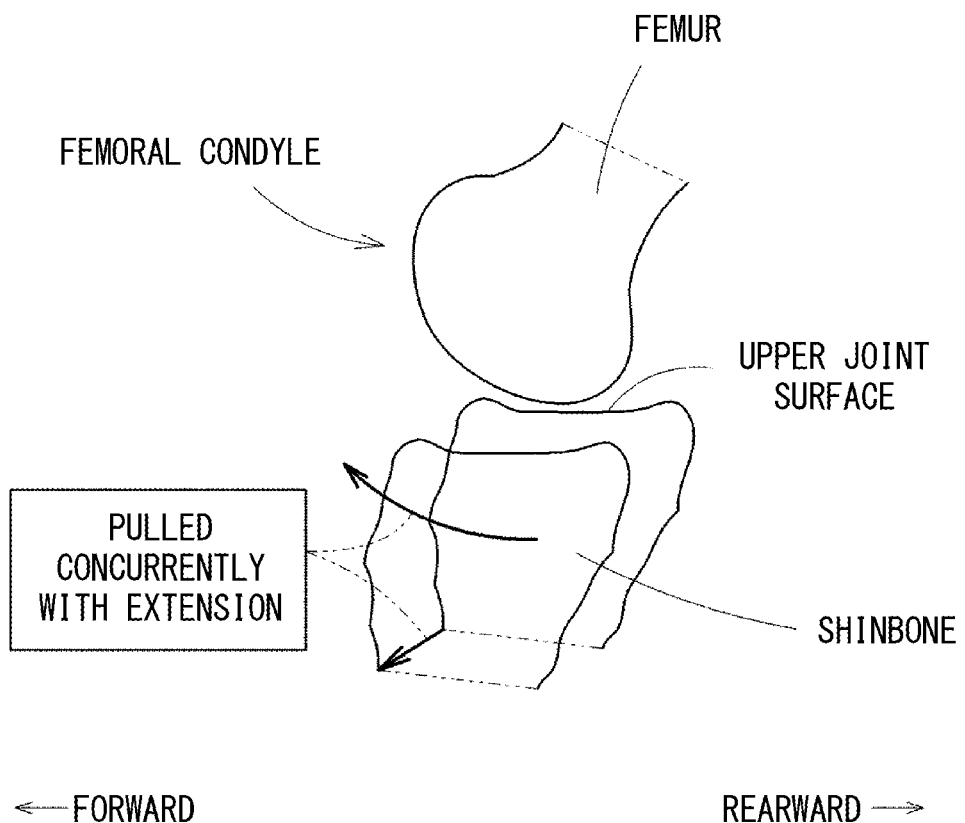
FIG. 3 is a side view showing a method of relieving pain when the knee joint with knee joint flexion contracture is extended.

As a result of thorough research, the inventors of the present disclosure have found that, when rehabilitation aimed at expanding the movable range of a knee joint with knee joint flexion contracture on an extension side is executed, pain in the knee joint that occurs at a time of rehabilitation can be relieved by intentionally pulling the shinbone downward and forward at a time the knee joint is extended, as shown in FIG. 3.

That is, as shown in FIG. 3, the shinbone is pulled downward at a time of extension of the knee joint, whereby the gap between the femoral condyle of the femur and the upper joint surface of the shinbone is expanded. The phrase "the shinbone is pulled downward at a time of extension of the knee joint" means that the shinbone is pulled toward the foot side in the longitudinal direction of the shinbone when the knee joint is extended.

Further, by pulling the shinbone forward when the knee joint is extended, an inappropriate positional relation of the upper joint surface of the shinbone with respect to the femoral condyle, which is typical for a knee joint with knee joint flexion contracture, temporarily returns to the appropriate positional relation. The phrase "pulling the shinbone forward when the knee joint is extended" means that the shinbone is pulled forward in the direction perpendicular to the longitudinal direction of the shinbone when the knee joint is extended.

In this manner, by intentionally pulling the shinbone downward and forward when the knee joint is extended, an appropriate gap is formed between the femoral condyle of the femur and the upper joint surface of the shinbone, and the positional relation of the upper joint surface of the shinbone with respect to the femoral condyle of the femur is improved so that there is no longer physical interference between them. As a result, pain in the knee joint that occurs at a time of rehabilitation aimed at expanding the movable range of the knee joint on the extension side can be relieved.

However, the above findings are based on the premise that the shinbone is pulled downward and forward when the knee joint is extended, and it is difficult to concurrently perform these three movements, especially with manual therapy.

In view of the above problem, the inventors of the present disclosure have made a knee brace that allows anyone to easily perform the above three movements, and further allows a patient to instead perform them by herself/himself.

Hereinafter, with reference to the drawings, specific embodiments to which the present disclosure is applied will be described in detail. However, the present disclosure is not limited to the following embodiments. Further, for the sake of clarity of the description, the following description and the drawings are omitted as appropriate.

First Embodiment

First, with reference to FIG. 4, a leg brace 1 according to a first embodiment will be described.

Figure 4:
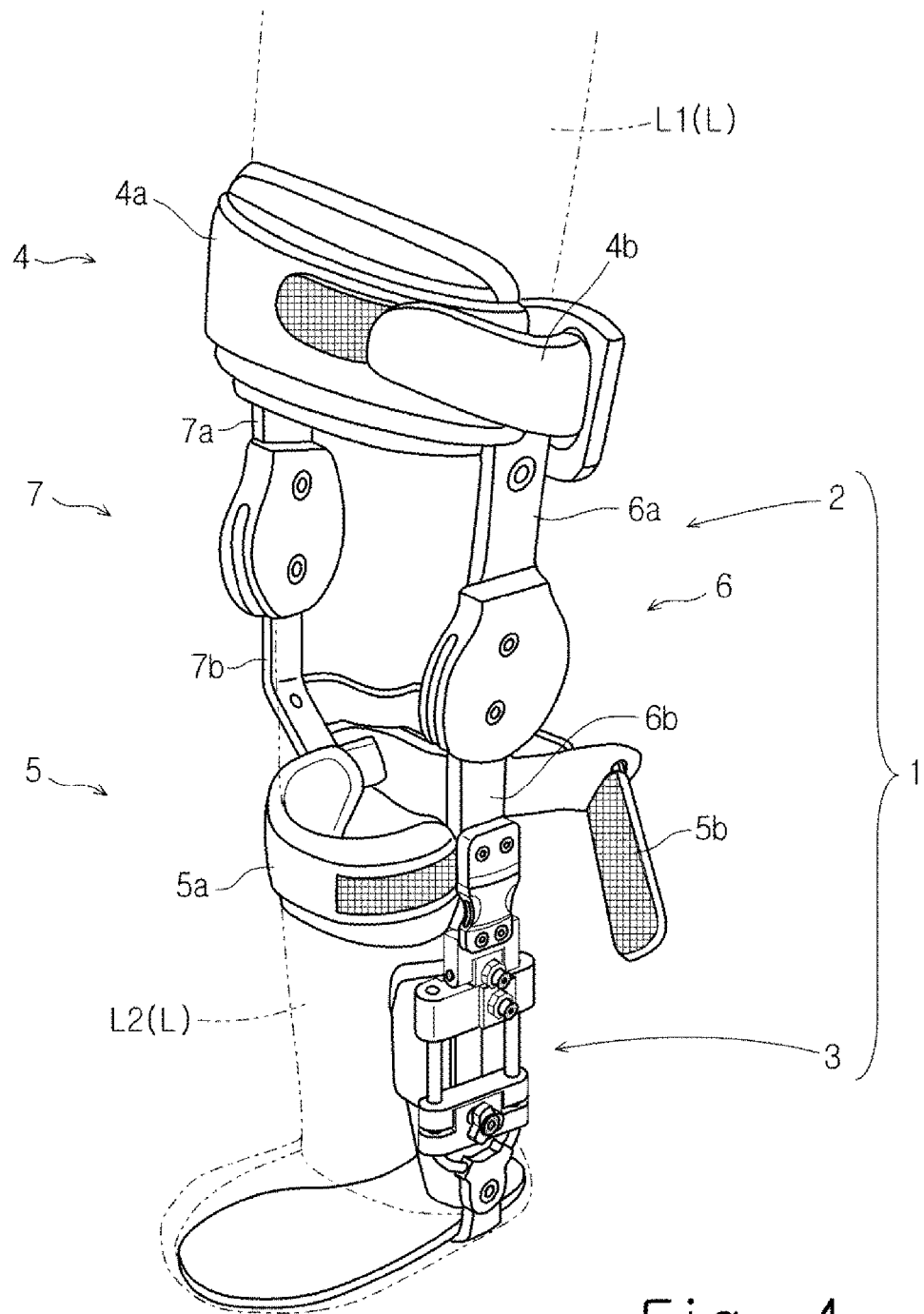
FIG. 4 is a perspective view of a leg brace (first embodiment)

FIG. 4 shows the leg brace 1 attached to the left leg L of a user. FIG. 4 shows the left leg L of the user by an alternate long and two short dashes line and shows the shoe that the user wears by an alternate long and short dash line.

As shown in FIG. 4, the leg brace 1 includes a knee brace 2 and a shank assisting tool 3. The knee brace 2, which is attached to the left leg L with knee osteoarthritis, is a brace that relieves pain that occurs when a knee joint with knee joint flexion contracture is extended. The knee brace 2, which is attached to the left leg L, is flexed following flexing of the knee joint. The shank assisting tool 3 prevents the thrust of the knee joint of the user. The description of the shank assisting tool 3 is omitted. Note that the shank assisting tool 3 is configured in such a way that it can be attached to and detached from the knee brace 2. Therefore, the shank assisting tool 3 can be removed from the knee brace 2 and the knee brace 2 can be used alone.

The knee brace 2 includes a thigh attachment part 4, a shank attachment part 5, an outer unit 6, and an inner unit 7.

The thigh attachment part 4 is attached to the thigh L1 of the left leg L of the user. The thigh attachment part 4 includes a thigh cuff 4a and a thigh belt 4b.

The thigh cuff 4a is arranged so as to be opposed to the front surface of the thigh L1 of the user. The thigh cuff 4a is curved to be convex toward the front in a plan view. The thigh belt 4b is wound around the thigh L1 of the user so that both the thigh L1 of the user and the thigh cuff 4a are concurrently wrapped in the thigh belt 4b, whereby the thigh cuff 4a is fixed to the thigh L1 of the user.

The shank attachment part 5 is attached to the shank L2 of the left leg L of the user. The shank attachment part 5 includes a shank cuff 5a and a shank belt 5b.

The shank cuff 5a is arranged so as to be opposed to the front surface of the shank L2 of the user. The shank cuff 5a is curved to be convex toward the front in a plan view. The shank belt 5b is wound around the shank L2 of the user so that both the shank L2 of the user and the shank cuff 5a are concurrently wrapped in the shank belt 5b, whereby the shank cuff 5a is fixed to the shank L2 of the user.

The outer unit 6, which couples the thigh attachment part 4 to the shank attachment part 5, is arranged on the outer (lateral) side of the left leg L (lower limb) of the user.

The outer unit 6 includes a thigh outer link 6a that is extended along the thigh L1 and is fixed to the thigh L1 by the thigh attachment part 4 and a shank outer link 6b that is extended along the shank L2 and is fixed to the shank L2 by the shank attachment part 5. The thigh outer link 6a and the shank outer link 6b are rotatably coupled to each other on the outer side of the knee joint of the user.

The inner unit 7, which couples the thigh attachment part 4 to the shank attachment part 5, is arranged on the inner (medial) side of the left leg L (lower limb) of the user.

The inner unit 7 includes a thigh inner link 7a that is extended along the thigh L1 and is fixed to the thigh L1 by the thigh attachment part 4 and a shank inner link 7b that is extended along the shank L2 and is fixed to the shank L2 by the shank attachment part 5. The thigh inner link 7a and the shank inner link 7b are rotatably coupled to each other on the inner side of the knee joint of the user.

Then, the outer unit 6 is configured in such a way that the shank outer link 6b moves away from the thigh outer link 6a in the longitudinal direction of the shank outer link 6b and the shank outer link 6b is drawn forward in a direction perpendicular to the longitudinal direction of the shank outer link 6b relative to the thigh outer link 6a as the knee joint of the user is extended. Likewise, the inner unit 7 is configured in such a way that the shank inner link 7b moves away from the thigh inner link 7a in the longitudinal direction of the shank inner link 7b and the shank inner link 7b is drawn forward in the direction perpendicular to the longitudinal direction of the shank inner link 7b relative to the thigh inner link 7a as the knee joint of the user is extended. The details thereof will be described below.

(Outer Unit 6)

Hereinafter, with reference to FIGS. 5 to 11, the part where the thigh outer link 6a is coupled to the shank outer link 6b will be described in detail.

Figure 5:
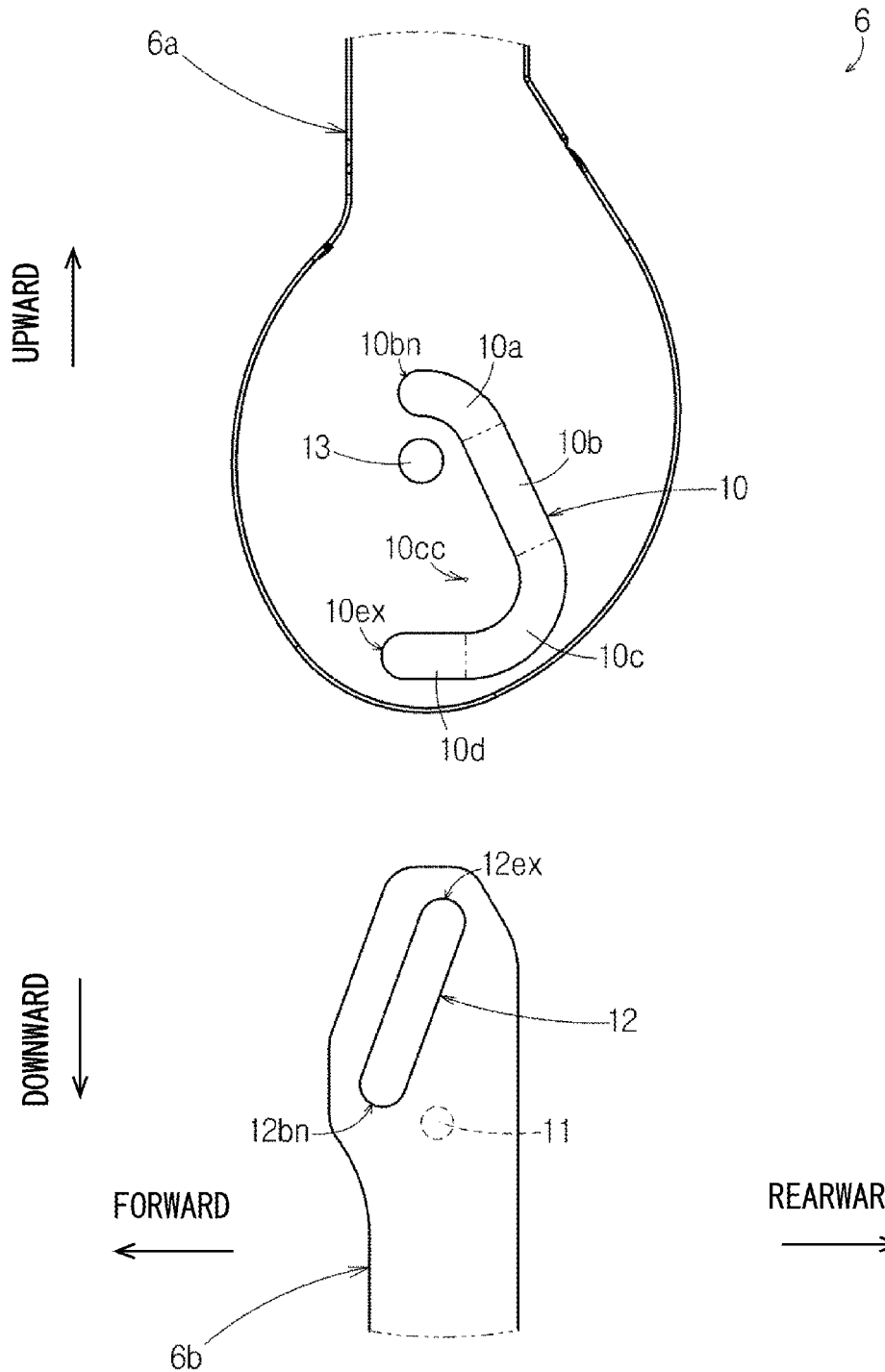
FIG. 5 is an exploded side view of an outer unit (first embodiment)
Figure 6:
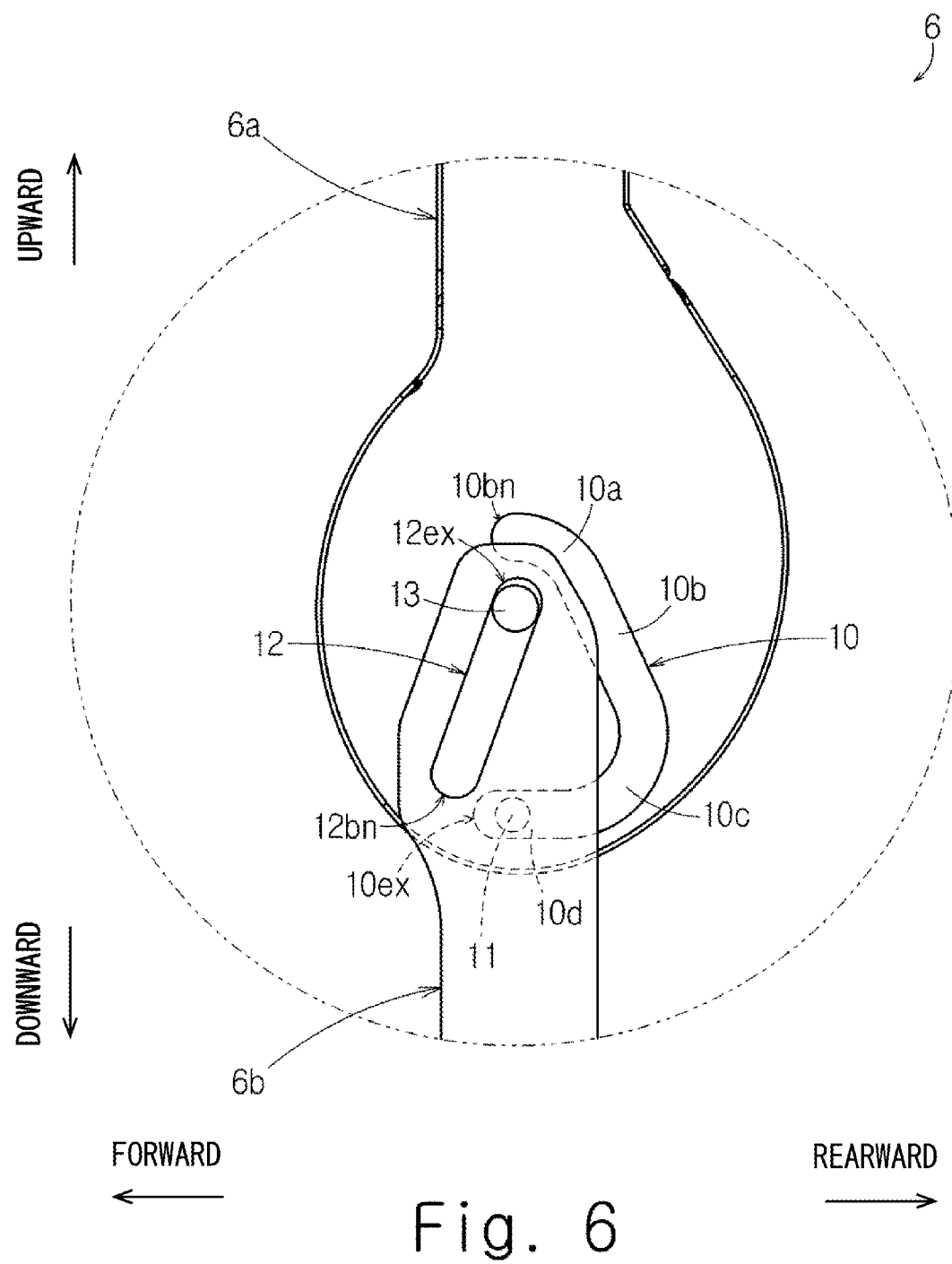
FIG. 6 is a partial side view of the outer unit when a knee joint angle is 0 degrees (first embodiment)

FIG. 5 shows a state in which the shank outer link 6b is detached from the thigh outer link 6a. FIG. 6 shows a state in which the shank outer link 6b is attached to the thigh outer link 6a.

As shown in FIGS. 5 and 6, a thigh cam 10 is formed in the thigh outer link 6a. A shank pin 11 that is engaged with the thigh cam 10 in such a way that it moves along the thigh cam 10 is formed in the shank outer link 6b. A shank cam 12 is formed in the shank outer link 6b. A thigh pin 13 that is engaged with the shank cam 12 in such a way that it moves along the shank cam 12 is formed in the thigh outer link 6a.

As shown in FIG. 6, the shank outer link 6b is arranged on the outer side (on the front side of the paper) of the thigh outer link 6a. Alternatively, the shank outer link 6b may be arranged on the inner side (on the back side of the paper) of the thigh outer link 6a.

As shown in FIG. 5, the shank pin 11 is protruded toward the inner side and the thigh pin 13 is protruded toward the outer side.

The thigh cam 10 is formed in the form of a groove that does not penetrate the thigh outer link 6a in the thickness direction of the thigh outer link 6a. Alternatively, the thigh cam 10 may be formed in the form of a slit that penetrates the thigh outer link 6a in the thickness direction of the thigh outer link 6a.

The shank cam 12 is formed in the form of a slit that penetrates the shank outer link 6b in the thickness direction of the shank outer link 6b. Alternatively, the shank cam 12 may be formed in the form of a groove that does not penetrate the shank outer link 6b in the thickness direction of the shank outer link 6b.

When the shank outer link 6b is rotated with respect to the thigh outer link 6a as shown in FIGS. 6 to 10 with the above structure, the thigh pin 13 moves along the shank cam 12 and the shank pin 11 moves along the thigh cam 10. That is, the thigh cam 10, the shank pin 11, the shank cam 12, and the thigh pin 13 work together so that the outer unit 6 is configured to be flexed following flexing of the knee joint.

In the following description with respect to the arrangement or the shape of each of the thigh cam 10, the shank pin 11, the shank cam 12, and the thigh pin 13, as shown in FIG. 5, the thigh outer link 6a and the shank outer link 6b are both extended along the vertical direction.

As shown in FIG. 5, the shank cam 12 is extended rearward as it moves away from the shank attachment part 5. The shank cam 12 is extended rearward as it extends upward. The shank cam 12 is inclined with respect to the longitudinal direction of the shank cam 12. The shank cam 12 is linearly extended. However, the shank cam 12 may be curved so as to be convex toward the front or may be curved so as to be convex toward the rear side. The shank cam 12 includes an extending-side end part 12ex and a flexing-side end part 12bn. The extending-side end part 12ex is an end part where the thigh pin 13 is positioned when the knee joint is extended and the knee joint angle becomes 0 degrees. The flexing-side end part 12bn is an end part where the thigh pin 13 is positioned when the knee joint is flexed and the knee joint angle becomes 120 degrees. Therefore, when the knee joint is extended, the thigh pin 13 moves from the flexing-side end part 12bn toward the extending-side end part 12ex. On the other hand, when the knee joint is flexed, the thigh pin 13 moves from the extending-side end part 12ex toward the flexing-side end part 12bn.

The shank pin 11 is arranged below the shank cam 12. The shank pin 11 is arranged closer to the shank attachment part 5 than to the shank cam 12. Therefore, when the thigh pin 13 is positioned in the flexing-side end part 12bn of the shank cam 12, the thigh pin 13 is made to come closest to the shank pin 11. In contrast, when the thigh pin 13 is positioned in the extending-side end part 12ex of the shank cam 12, the thigh pin 13 moves farthest away from the shank pin 11.

Referring once again to FIG. 5, the thigh cam 10 is formed in such a way that the shank attachment part 5 moves away from the thigh pin 13 as the knee joint is extended. In other words, the thigh cam 10 is formed in such a way that it functions to move the shank attachment part 5 away from the thigh pin 13 as the knee joint is extended.

Specifically, the thigh cam 10 is extended in a curved shape so as to surround the thigh pin 13. The thigh cam 10 is curved in a U-shape with an opening toward the front. The thigh cam 10 includes an extending-side end part 10ex and a flexing-side end part 10bn. The extending-side end part 10ex is an end part where the shank pin 11 is positioned when the knee joint is extended and the knee joint angle becomes 0 degrees. The flexing-side end part 10bn is an end part where the shank pin 11 is positioned when the knee joint is flexed and the knee joint angle becomes 120 degrees. Therefore, when the knee joint is extended, the shank pin 11 moves from the flexing-side end part 10bn toward the extending-side end part 10ex. On the other hand, when the knee joint is flexed, the shank pin 11 moves from the extending-side end part 10ex toward the flexing-side end part 10bn. The thigh cam 10 includes a flexing cam part 10a, a transition linear cam part 10b, a transition bending cam part 10c, and an extending cam part 10d. The flexing cam part 10a includes a flexing-side end part 10bn. The extending cam part 10d includes an extending-side end part 10ex. The flexing cam part 10a, the transition linear cam part 10b, the transition bending cam part 10c, and the extending cam part 10d are continuously formed in this order. Therefore, the flexing cam part 10a, the transition linear cam part 10b, the transition bending cam part 10c, and the extending cam part 10d are continuously formed in this order from the flexing-side end part 10bn toward the extending-side end part 10ex. In FIG. 5, the boundary between the flexing cam part 10a and the transition linear cam part 10b, the boundary between the transition linear cam part 10b and the transition bending cam part 10c, and the boundary between the transition bending cam part 10c and the extending cam part 10d are shown by alternate long and two short dashes lines.

The flexing cam part 10a is arranged above the thigh pin 13 and is extended in an arc shape with the center of the thigh pin 13. That is, the flexing cam part 10a is curved so as to be convex upward.

The transition linear cam part 10b is arranged in the rear of the thigh pin 13 and is linearly extended. The transition linear cam part 10b is extended rearward as it is extended downward. Therefore, the transition linear cam part 10b is formed in such a manner that it moves away from the thigh pin 13 from the side of the flexing-side end part 10bn to the side of the extending-side end part 10ex.

The transition bending cam part 10c is arranged below and in the rear of the thigh pin 13, and is extended in an arc shape around the center of curvature 10cc located below the thigh pin 13. That is, the transition bending cam part 10c is curved so as to be convex in the direction away from the thigh pin 13, in other words, so as to be convex downwardly and rearwardly. Therefore, the transition bending cam part 10c is formed in such a way that it moves away from the thigh pin 13 from the side of the flexing-side end part 10bn to the side of the extending-side end part 10ex.

The extending cam part 10d is arranged below the thigh pin 13 and is linearly extended. The extending cam part 10d is extended in the front-back direction. Therefore, the extending cam part 10d is made to slightly come close to the thigh pin 13 from the side of the flexing-side end part 10bn to the side of the extending-side end part 10ex, and then it slightly moves away from the thigh pin 13.

Referring next to FIGS. 6 to 10, how the thigh cam 10, the shank pin 11, the shank cam 12, and the thigh pin 13 work together in accordance with the knee joint angle will be described.

(Knee Joint Angle: 0 Degrees)

As shown in FIG. 6, when the knee joint angle is 0 degrees, that is, when the knee joint and the outer unit 6 are in the extended state, the thigh pin 13 is positioned in the extending-side end part 12ex of the shank cam 12 and the shank pin 11 is positioned in the extending-side end part 10ex of the extending cam part 10d of the thigh cam 10.

As described above, when the knee joint angle is 0 degrees, the shank pin 11 is positioned in the extending cam part 10d and the extending cam part 10d is extended in the front-back direction. This prevents the shank pin 11 from moving toward the transition bending cam part 10c of the thigh cam 10 due to a ground reaction force that the diseased leg to which the knee brace 2 is attached receives when it contacts the ground. Therefore, when the diseased leg to which the knee brace 2 is attached contacts the ground, the extended state of the knee joint and the outer unit 6 is maintained.

(Knee Joint Angle: 30 Degrees)

Figure 7:
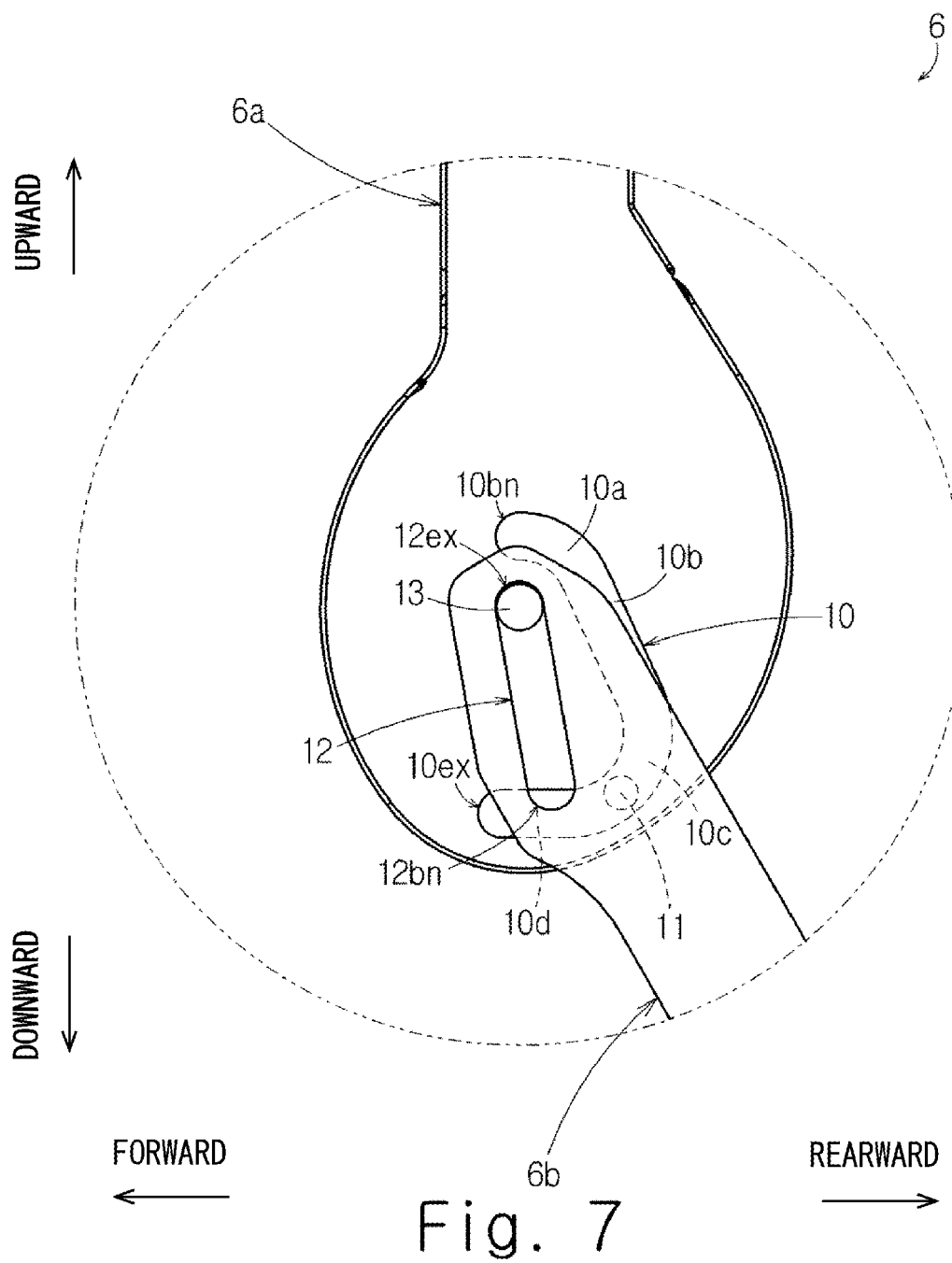
FIG. 7 is a partial side view of the outer unit when the knee joint angle is 30 degrees (first embodiment)

As shown in FIG. 7, when the knee joint angle is 30 degrees, the thigh pin 13 is positioned in the extending-side end part 12ex of the shank cam 12 and the shank pin 11 is positioned in the transition bending cam part 10c of the thigh cam 10.

(Knee Joint Angle: 60 Degrees)

Figure 8:
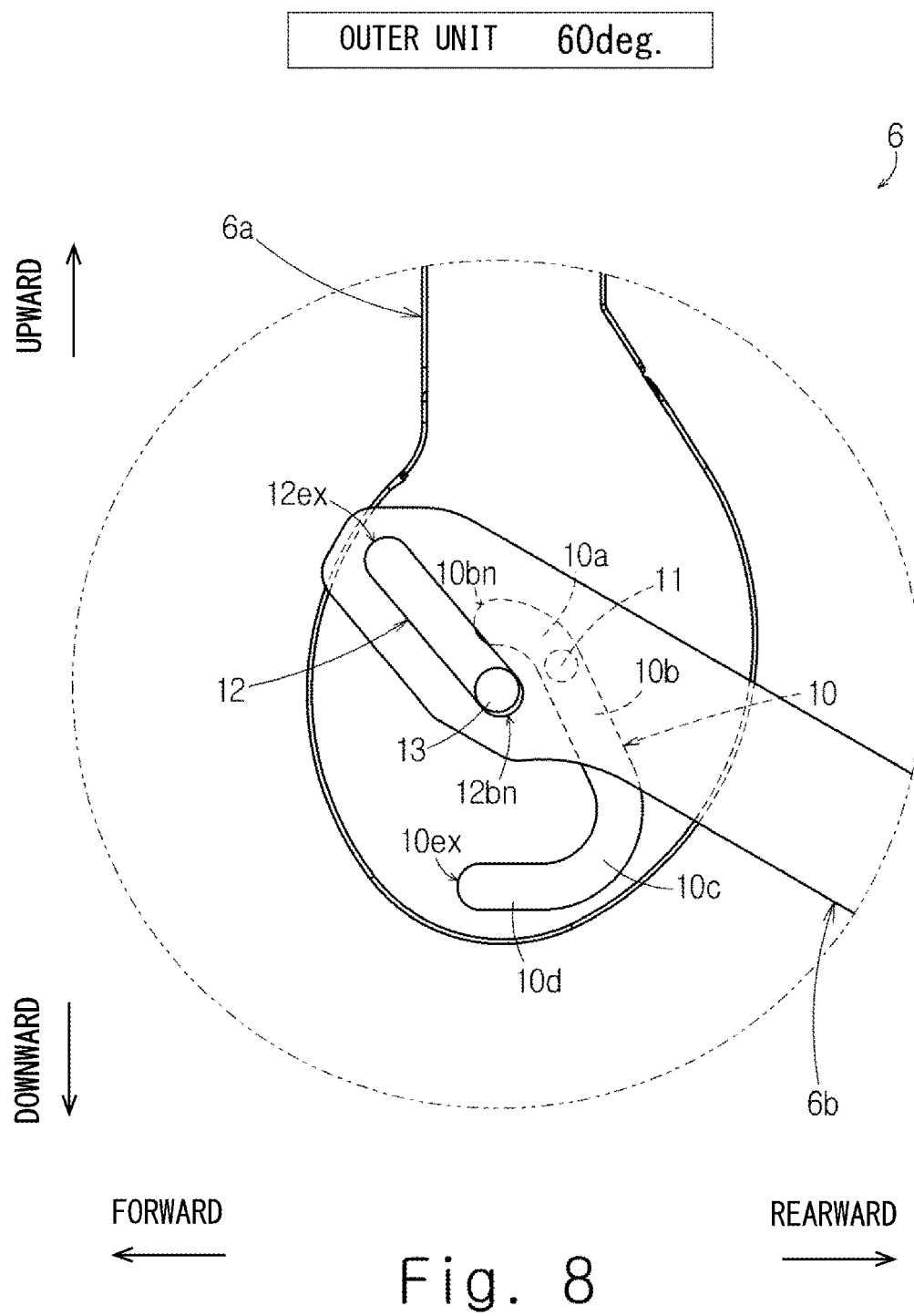
FIG. 8 is a partial side view of the outer unit when the knee joint angle is 60 degrees (first embodiment)

As shown in FIG. 8, when the knee joint angle is 60 degrees, the thigh pin 13 is positioned in the flexing-side end part 12bn of the shank cam 12 and the shank pin 11 is positioned in the boundary between the flexing cam part 10a and the transition linear cam part 10b of the thigh cam 10.

(Knee Joint Angle: 90 degrees)

Figure 9:
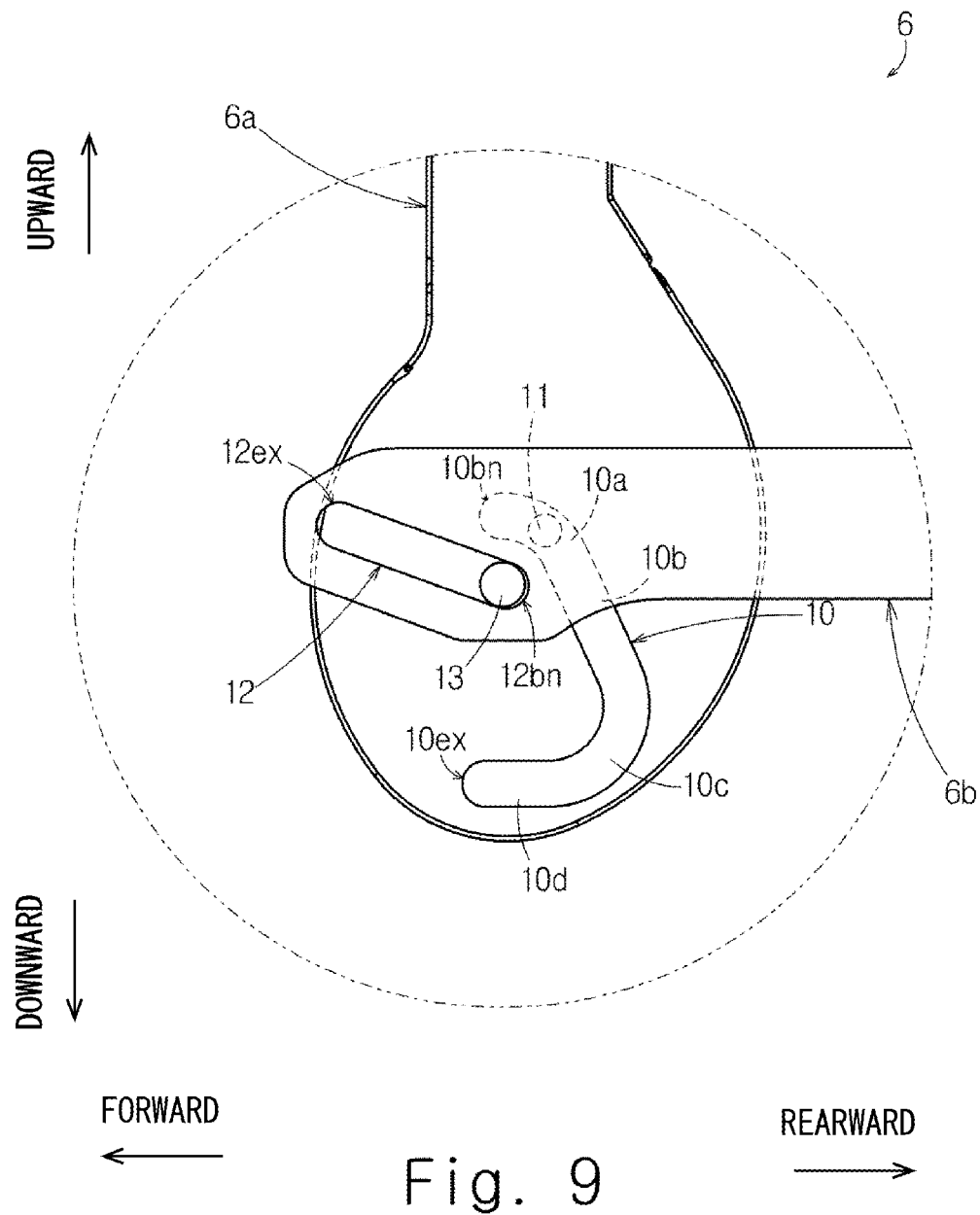
FIG. 9 is a partial side view of the outer unit when the knee joint angle is 90 degrees (first embodiment)

As shown in FIG. 9, when the knee joint angle is 90 degrees, the thigh pin 13 is positioned in the flexing-side end part 12*bn* of the shank cam 12 and the shank pin 11 is positioned in the flexing cam part 10*a* of the thigh cam 10.
(Knee Joint Angle: 120 Degrees)

Figure 10:
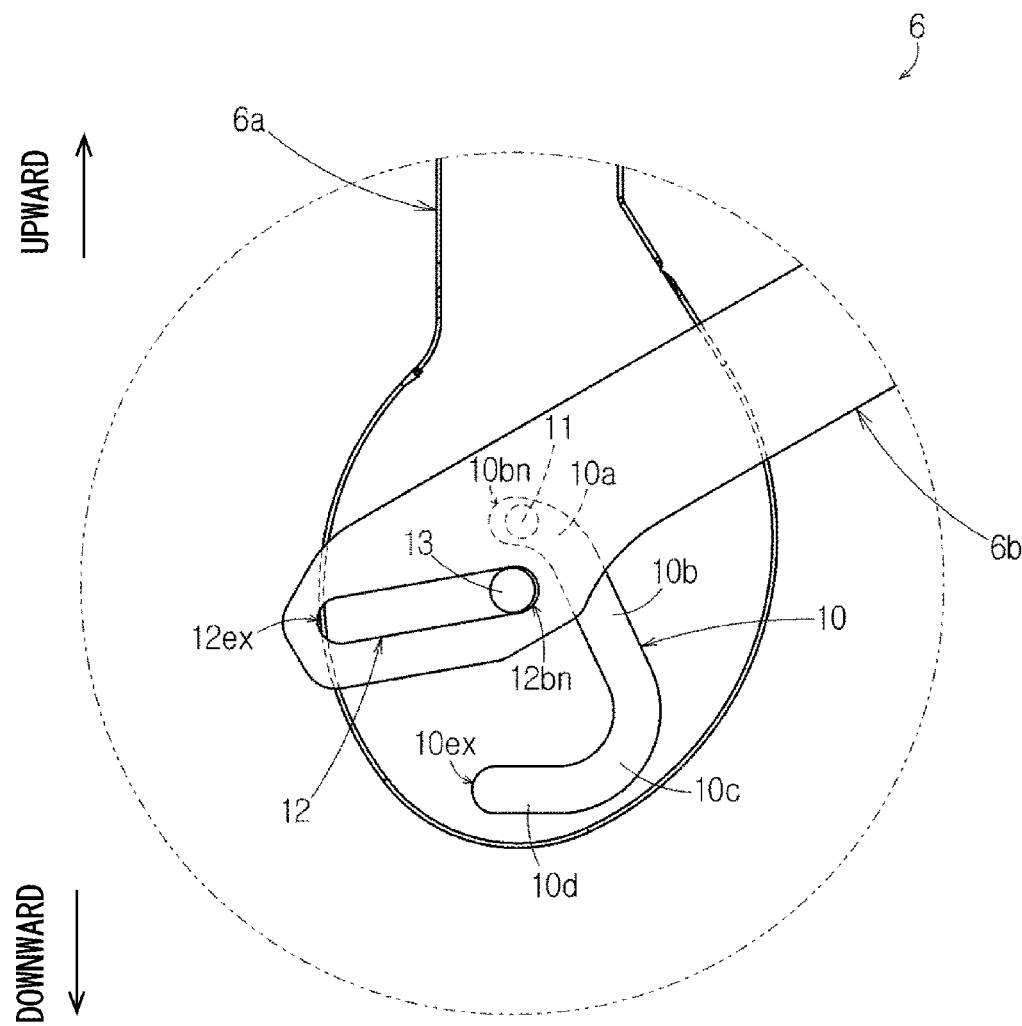
FIG. 10 is a partial side view of the outer unit when the knee joint angle is 120 degrees (first embodiment)

As shown in FIG. 10, when the knee joint angle is 120 degrees, the thigh pin 13 is positioned in the flexing-side end part 12*bn* of the shank cam 12 and the shank pin 11 is positioned in the flexing-side end part 10*bn* of the flexing cam part 10*a* of the thigh cam 10.
(Knee Joint Angle: 120 Degrees→60 Degrees)

While the knee joint is extended and the knee joint angle is changed from 120 degrees to 60 degrees as shown in FIGS. 8 to 10, the shank pin 11 moves away from the flexing-side end part 10*bn* along the flexing cam part 10*a* of the thigh cam 10. On the other hand, the flexing cam part 10*a* of the thigh cam 10 is extended in an arc shape with the center of the thigh pin 13. Therefore, while the knee joint is extended and the knee joint angle is changed from 120 degrees to 60 degrees as shown in FIGS. 8 to 10, the thigh pin 13 maintains a state in which it is restrained in the flexing-side end part 12*bn* of the shank cam 12. That is, the shank outer link 6*b* is rotated about the thigh pin 13 by 60 degrees.
(Knee Joint Angle: 60 Degrees→30 Degrees)

While the knee joint is extended and the knee joint angle is changed from 60 degrees to 30 degrees as shown in FIGS. 7 and 8, the shank pin 11 moves in such a way that it moves away from the flexing-side end part 10*bn* along the transition linear cam part 10*b* and the transition bending cam part 10*c* of the thigh cam 10. On the other hand, the thigh cam 10 is formed in such a way that it moves away from the thigh pin 13 from the transition linear cam part 10*b* to the transition bending cam part 10*c* of the thigh cam 10. Therefore, while the knee joint is extended and the knee joint is changed from 60 degrees to 30 degrees as shown in FIGS. 7 and 8, the thigh pin 13 moves from the flexing-side end part 12*bn* of the shank cam 12 to the extending-side end part 12*ex*. As a result, the shank outer link 6*b* is not only rotated about the thigh pin 13 by 30 degrees but also the shank outer link 6*b* moves away from the thigh outer link 6*a* in the longitudinal direction of the shank outer link 6*b* and the shank outer link 6*b* is drawn forward in a direction perpendicular to the longitudinal direction of the shank outer link 6*b* relative to the thigh outer link 6*a* while the knee joint is extended and the knee joint is changed from 60 degrees to 30 degrees. It can also be said that the "forward" means "in the direction in which the shank L2 of the left leg L is swung when the left leg L is switched from the standing leg state to the idling leg state" or "on the toe side".

Figure 11:
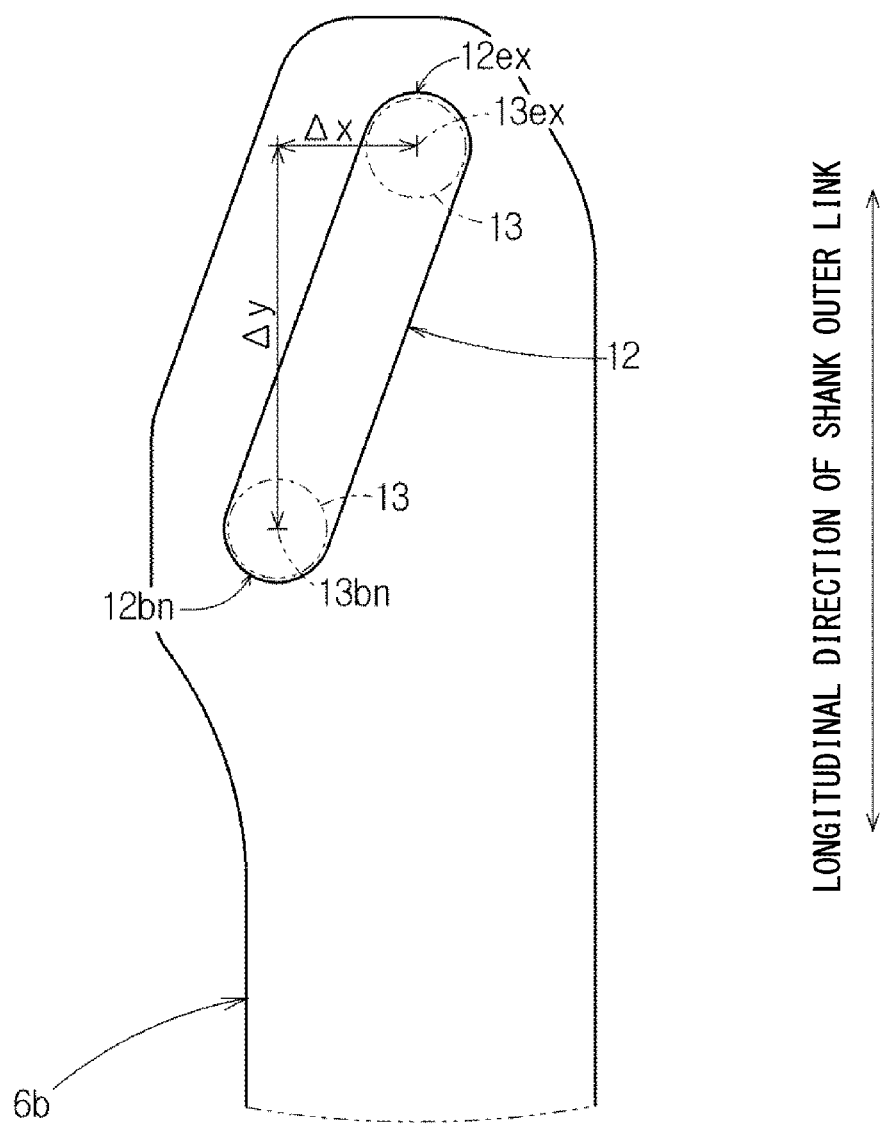
FIG. 11 is a side view of a shank outer link (first embodiment)

FIG. 11 shows an amount of displacement $\Delta y$ that the shank outer link 6*b* moves away from the thigh outer link 6*a* in the longitudinal direction of the shank outer link 6*b* and an amount of displacement $\Delta x$ that the shank outer link 6*b* is drawn forward in a direction perpendicular to the longitudinal direction of the shank outer link 6*b* relative to the thigh outer link 6*a* while the knee joint is extended and the knee joint is changed from 60 degrees to 30 degrees.

The amount of displacement $\Delta y$ corresponds to a difference between a center point 13*bn* of the thigh pin 13 when the thigh pin 13 is positioned in the flexing-side end part 12*bn* and a center point 13*ex* of the thigh pin 13 when the thigh pin 13 is positioned in the extending-side end part 12*ex* in the longitudinal direction of the shank outer link 6*b*.

On the other hand, the amount of displacement $\Delta x$ corresponds to a difference between the center point 13*bn* of the thigh pin 13 when the thigh pin 13 is positioned in the flexing-side end part 12*bn* and the center point 13*ex* of the thigh pin 13 when the thigh pin 13 is positioned in the extending-side end part 12*ex* in the direction that is perpendicular to the longitudinal direction of the shank outer link 6*b*.

It is seen in FIG. 11 that, by adjusting the inclination angle of the shank cam 12 with respect to the longitudinal direction of the shank outer link 6*b*, the ratio of the amount of displacement $\Delta x$ to the amount of displacement $\Delta y$ can be adjusted. Further, by adjusting the length of the shank cam 12, the amount of displacement $\Delta x$ and the amount of displacement $\Delta y$ can be increased or decreased while maintaining the ratio of the amount of displacement $\Delta x$ to the amount of displacement $\Delta y$.

Figure 12:
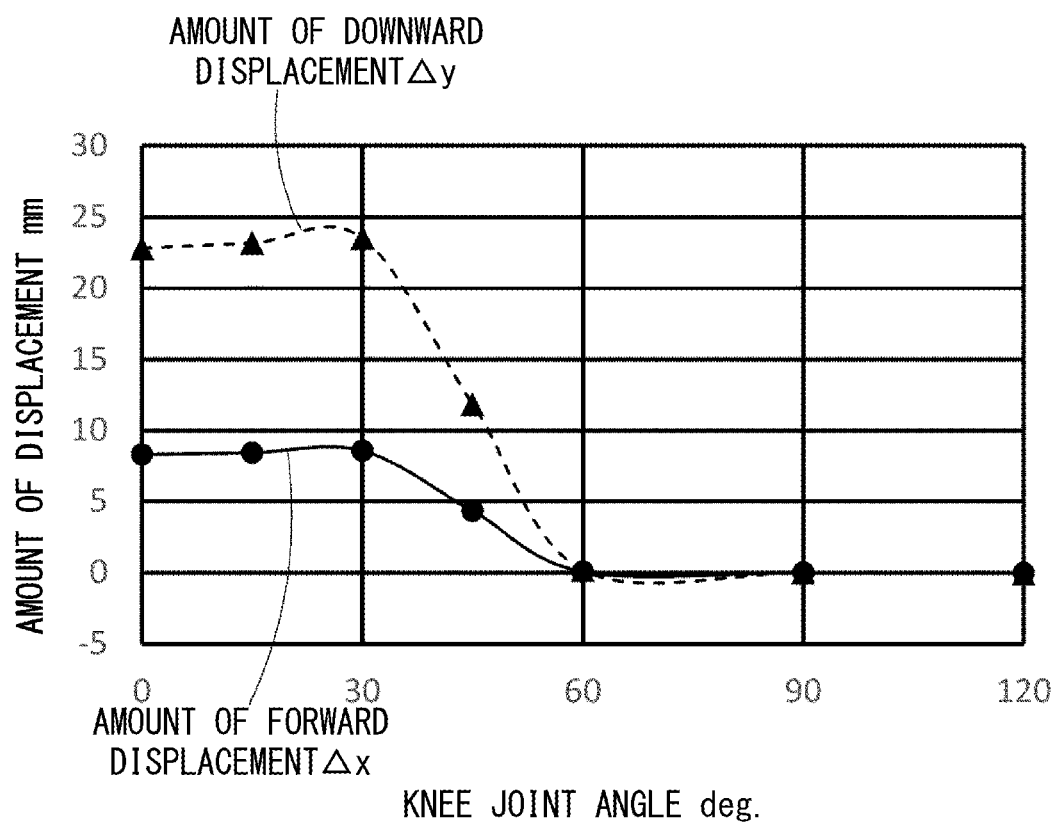
FIG. 12 is a graph showing a relation between a knee joint angle and an amount of displacement.

FIG. 12 shows a graph illustrating the relation between the knee joint angle, and the amount of displacement $\Delta x$ and the amount of displacement $\Delta y$. As shown in FIG. 12, when the knee joint is extended, the amount of displacement $\Delta x$ and the amount of displacement $\Delta y$ increase while the knee joint angle is changed from 60 degrees to 30 degrees. Specifically, in the above section, the amount of displacement $\Delta x$ is 8.5 mm and the amount of displacement $\Delta y$ is 23.5 mm. Further, in the example shown in FIG. 12, when the knee joint angle is 90 degrees, the leg brace 1 is, in embodiments, attached to the left leg L of the user who is, typically, seated in a chair. The section of the knee joint angle in which the amount of displacement $\Delta x$ and the amount of displacement $\Delta y$ are particularly changed as shown in FIG. 12, the amounts of displacement, and the above knee joint angle when the leg brace 1 is attached to the left leg L of the user are merely examples, and not limited to them.
(Knee Joint Angle: 30 Degrees→0 Degrees)

As shown in FIGS. 6 and 7, while the knee joint is extended and the knee joint angle is changed from 30 degrees to 0 degrees, the shank pin 11 moves so as to approach the extending-side end part 10*ex* along the extending cam part 10*d* of the thigh cam 10. On the other hand, the distance between the extending cam part 10*d* of the thigh cam 10 and the thigh pin 13 changes little throughout the whole area of the extending cam part 10*d*. Therefore, as shown in FIGS. 6 and 7, while the knee joint is extended and the knee joint is changed from 30 degrees to 0 degrees, the thigh pin 13 maintains a state in which it is substantially restrained in the extending-side end part 12*ex* of the shank cam 12. That is, the shank outer link 6*b* is rotated about the thigh pin 13 by 30 degrees.
(Inner Unit 7)

Since the structure of the inner unit 7 shown in FIG. 4 is symmetrical to the structure of the outer unit 6 with respect to the midline of the left leg L, the detailed descriptions thereof will be omitted.

In short, the inner unit 7 is configured as follows. The thigh cam is formed in the thigh inner link 7*a*. The shank pin that is engaged with the thigh cam so that it moves along the thigh cam is formed in the shank inner link 7*b*. The shank cam is formed in the shank inner link 7*b*. The thigh pin that is engaged with the shank cam in such a way that it moves along the shank cam is formed in the thigh inner link 7*a*. The shank cam is extended rearward as it moves away from the shank attachment part 5. The thigh cam is formed in such a way that the shank attachment part moves away from the thigh pin as the knee joint is extended.

According to the aforementioned structure, by just attaching the leg brace 1 to the diseased leg, the movement of intentionally pulling the shinbone downward and forward is achieved when the knee joint is extended. As a result, as shown in FIG. 3, an appropriate gap is formed between the femoral condyle of the femur and the upper joint surface of the shinbone, and the upper joint surface of the shinbone does not physically interfere with the femoral condyle of the femur. As a result, pain in the knee joint that occurs at a time of rehabilitation is relieved.

While the first embodiment has been described above, the above embodiment includes the following features.

The knee brace 2 includes the thigh attachment part 4 attached to the thigh L1 of the user, the shank attachment part 5 attached to the shank L2 of the user, the outer unit 6 that couples the thigh attachment part 4 to the shank attachment part 5 and is arranged on the outer (lateral) side of the left leg L (lower limb) of the user, and the inner unit 7 that couples the thigh attachment part 4 to the shank attachment part 5 and is arranged on the inner (medial) side of the left leg L of the user. The outer unit 6 includes the thigh outer link 6a that is extended along the thigh L1 and is fixed to the thigh L1 by the thigh attachment part 4 and the shank outer link 6b that is extended along the shank L2 and is fixed to the shank L2 by the shank attachment part 5. The thigh outer link 6a and the shank outer link 6b are rotatably coupled to each other on the outer side of the knee joint of the user. The inner unit 7 includes the thigh inner link 7a that is extended along the thigh L1 and is fixed to the thigh L1 by the thigh attachment part 4 and the shank inner link 7b that is extended along the shank L2 and is fixed to the shank L2 by the shank attachment part 5. The thigh inner link 7a and the shank inner link 7b are rotatably coupled to each other on the inner side of the knee joint of the user. The outer unit 6 is configured in such a way that the shank outer link 6b moves away from the thigh outer link 6a in the longitudinal direction of the shank outer link 6b and the shank outer link 6b is drawn forward in a direction perpendicular to the longitudinal direction of the shank outer link 6b relative to the thigh outer link 6a as the knee joint of the user is extended. The inner unit 7 is configured in such a way that the shank inner link 7b moves away from the thigh inner link 7a in the longitudinal direction of the shank inner link 7b and the shank inner link 7b is drawn forward in the direction perpendicular to the longitudinal direction of the shank inner link 7b relative to the thigh inner link 7a as the knee joint of the user is extended. According to the aforementioned structure, it is possible to relieve pain that occurs when a knee joint with knee joint flexion contracture is extended.

Further, as shown in FIG. 5, the thigh cam 10 is formed in the thigh outer link 6a. The shank pin 11 that is engaged with the thigh cam 10 so that it moves along the thigh cam 10 is formed in the shank outer link 6b. The shank cam 12 is formed in the shank outer link 6b. The thigh pin 13 that is engaged with the shank cam 12 so that it moves along the shank cam 12 is formed in the thigh outer link 6a. The shank cam 12 is extended rearward as it moves away from the shank attachment part 5. The thigh cam 10 is formed in such a way that the shank attachment part 5 moves away from the thigh pin 13 as the knee joint is extended.

According to the aforementioned structure, the relative movement of the shank outer link 6b with respect to the thigh outer link 6a described above is achieved with a simple structure.

Further, as shown in FIG. 12, when it is defined that the knee joint angle when the knee joint is in an extended state is 0 degrees and the knee joint angle increases as the knee joint is flexed, the thigh cam 10 is, in embodiments, formed in such a way that the shank attachment part 5 moves away from the thigh pin 13 while the knee joint angle is changed from 90 degrees to 0 degrees. Further specifically, the thigh cam 10 is, in embodiments, formed in such a way that the shank attachment part 5 moves away from the thigh pin 13 while the knee joint angle is changed from 60 degrees to 30 degrees. As one example, the amount of displacement $\Delta y$ in FIG. 12 is focused on. According to the aforementioned structure, the amount of displacement $\Delta y$ increases at the timing when pain occurs when the knee joint with knee joint flexion contracture is extended, whereby it is possible to efficiently relieve this pain.

Second Embodiment

Referring next to FIGS. 13 to 19, a leg brace 1 according to a second embodiment will be described. Hereinafter, the difference between this embodiment and the above first embodiment will be mainly described and overlapping descriptions will be omitted.

The part where the thigh outer link 6a is coupled to the shank outer link 6b according to this embodiment is different from that in the above first embodiment.

Figure 13:
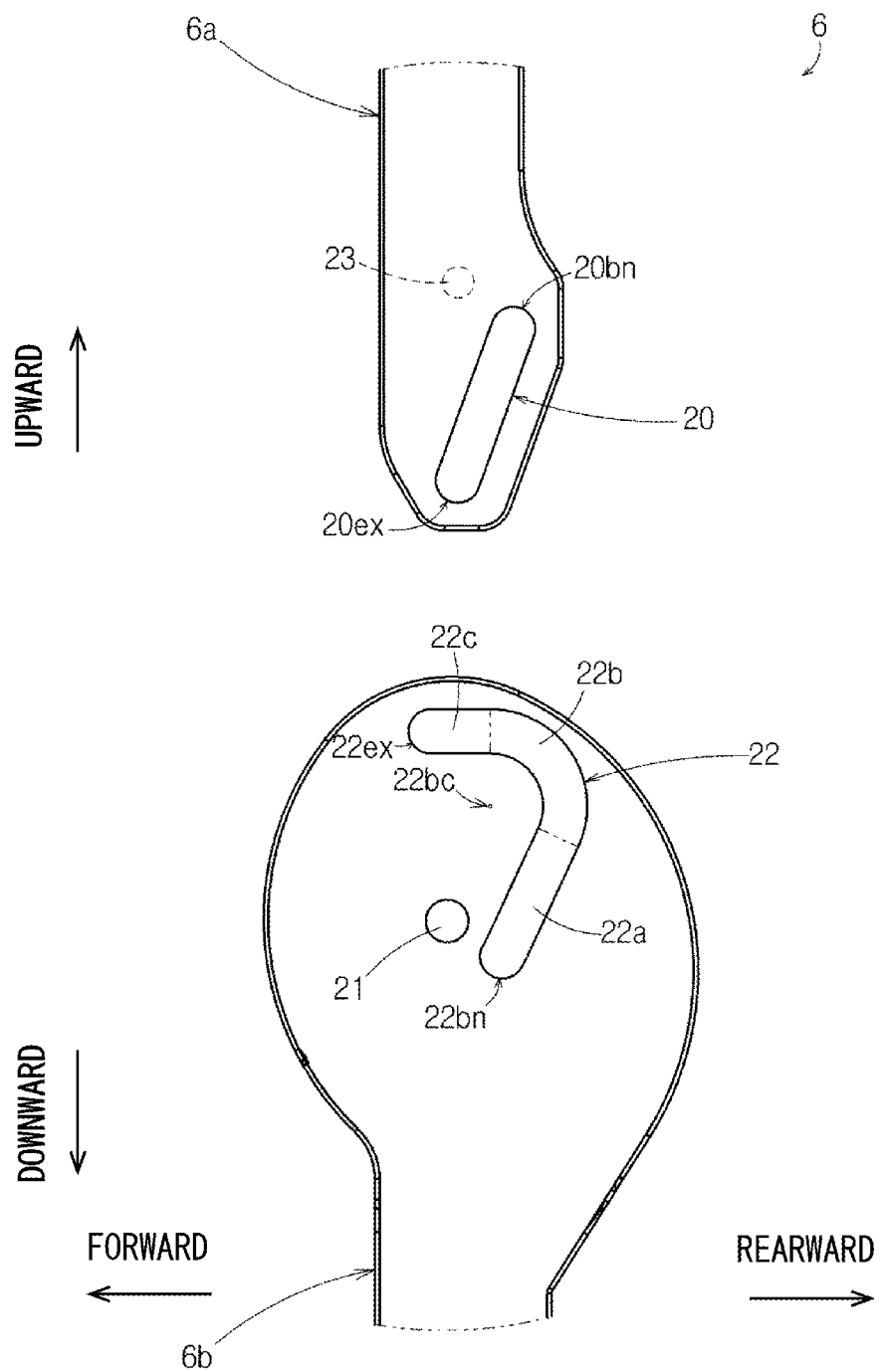
FIG. 13 is an exploded side view of an outer unit (second embodiment)
Figure 14:
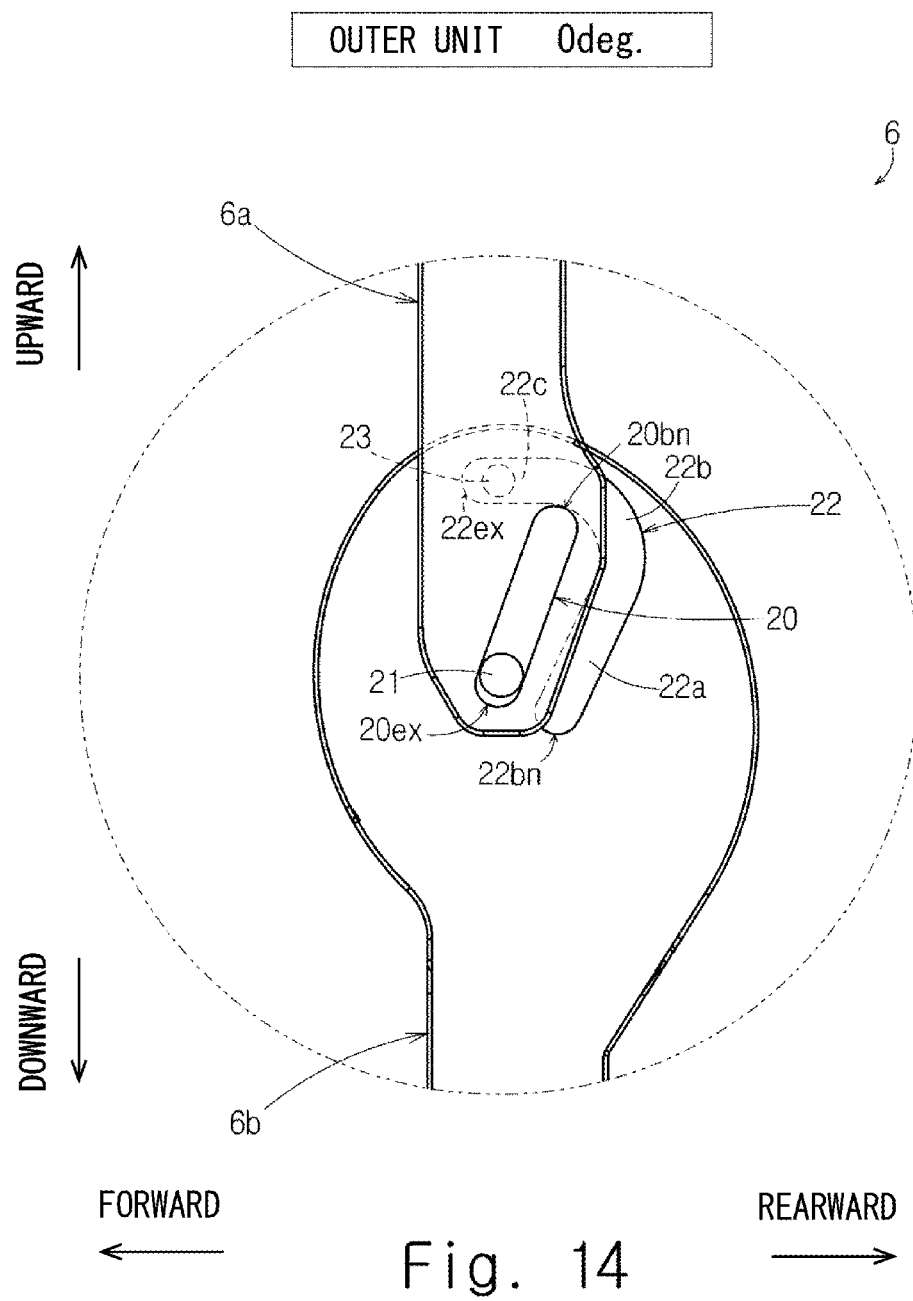
FIG. 14 is a partial side view of the outer unit when a knee joint angle is 0 degrees (second embodiment)

FIG. 13 shows a state in which the shank outer link 6b is detached from the thigh outer link 6a. FIG. 14 shows a state in which the shank outer link 6b is attached to the thigh outer link 6a.

As shown in FIGS. 13 and 14, the thigh cam 20 is formed in the thigh outer link 6a. The shank pin 21 that is engaged with the thigh cam 20 so as to move along the thigh cam 20 is formed in the shank outer link 6b. The shank cam 22 is formed in the shank outer link 6b. The thigh pin 23 that is engaged with the shank cam 22 so as to move along the shank cam 22 is formed in the thigh outer link 6a.

As shown in FIG. 14, the shank outer link 6b is arranged on the inner side (on the back side of the paper) of the thigh outer link 6a. Alternatively, the shank outer link 6b may be arranged on the outer side (on the front side of the paper) of the thigh outer link 6a.

As shown in FIG. 13, the shank pin 21 is protruded toward the outer side and the thigh pin 13 is protruded toward the inner side.

The thigh cam 20 is formed in the form of a slit that penetrates the thigh outer link 6a in the thickness direction of the thigh outer link 6a. Alternatively, the thigh cam 20 may be formed in the form of a groove that does not penetrate the thigh outer link 6a in the thickness direction of the thigh outer link 6a.

The shank cam 22 is formed in the form of a groove that does not penetrate the shank outer link 6b in the thickness direction of the shank outer link 6b. Alternatively, the shank cam 22 may be formed in the form of a slit that penetrates the shank outer link 6b in the thickness direction of the shank outer link 6b.

When the shank outer link 6b is rotated with respect to the thigh outer link 6a as shown in FIGS. 14 to 18 with the above structure, the thigh pin 23 is moved along the shank cam 22 and the shank pin 21 is moved along the thigh cam 20. That is, as a result of the thigh cam 20, the shank pin 21, the shank cam 22, and the thigh pin 23 working together, the outer unit 6 is configured to be flexed following flexing of the knee joint.

In the following description with respect to the arrangement or the shape of each of the thigh cam 20, the shank pin 21, the shank cam 22, and the thigh pin 23, as shown in FIG. 13, the thigh outer link 6a and the shank outer link 6b are both extended along the vertical direction.

As shown in FIG. 13, the thigh cam 20 is extended forward as it moves away from the thigh attachment part 4. The thigh cam 20 is extended rearward as it is extended upward. The thigh cam 20 is inclined with respect to the longitudinal direction of the thigh cam 20. The thigh cam 20 is linearly extended. However, the thigh cam 20 may be curved so to be convex toward the front or may be curved so as to be convex toward the rear side. The thigh cam 20 includes an extending-side end part 20*ex* and a flexing-side end part 20*bn*. The extending-side end part 20*ex* is an end part where the thigh pin 23 is positioned when the knee joint is extended and the knee joint angle becomes 0 degrees. The flexing-side end part 20*bn* is an end part where the thigh pin 23 is positioned when the knee joint is flexed and the knee joint angle becomes 120 degrees. Therefore, when the knee joint is extended, the shank pin 21 moves from the flexing-side end part 20*bn* toward the extending-side end part 20*ex*. In contrast, when the knee joint is flexed, the shank pin 21 moves from the extending-side end part 20*ex* to the flexing-side end part 20*bn*.

The thigh pin 23 is arranged above the thigh cam 20. The thigh pin 23 is arranged closer to the thigh attachment part 4 than to the thigh cam 20. Therefore, when the shank pin 21 is positioned in the flexing-side end part 20*bn* of the thigh cam 20, the shank pin 21 is made to come closest to the thigh pin 23. In contrast, when the shank pin 21 is positioned in the extending-side end part 20*ex* of the thigh cam 20, the shank pin 21 moves farthest away from the thigh pin 23.

Referring once again to FIG. 13, the shank cam 22 is formed in such a way that the shank attachment part 5 moves away from the thigh pin 23 as the knee joint is extended. In other words, the shank cam 22 is formed in such a way that it functions to move the shank attachment part 5 away from the thigh pin 23 as the knee joint is extended.

Specifically, the shank cam 22 is extended in a curved shape so as to surround the shank pin 21. The shank cam 22 is curved in a U-shape with an opening toward the front. The shank cam 22 includes an extending-side end part 22*ex* and a flexing-side end part 22*bn*. The extending-side end part 22*ex* is an end part where the thigh pin 23 is positioned when the knee joint is extended and the knee joint angle becomes 0 degrees. The flexing-side end part 22*bn* is an end part where the thigh pin 23 is positioned when the knee joint is flexed and the knee joint angle becomes 120 degrees. Therefore, when the knee joint is extended, the thigh pin 23 is moved from the flexing-side end part 22*bn* toward the extending-side end part 22*ex*. In contrast, when the knee joint is flexed, the thigh pin 23 is moved from the extending-side end part 22*ex* toward the flexing-side end part 22*bn*. The shank cam 22 includes a flexing cam part 22*a*, a bending cam part 22*b*, and an extending cam part 22*c*. The flexing cam part 22*a* includes a flexing-side end part 22*bn*. The extending cam part 22*c* includes an extending-side end part 22*ex*. The flexing cam part 22*a*, the bending cam part 22*b*, and the extending cam part 22*c* are continuously formed in this order. Therefore, the flexing cam part 22*a*, the bending cam part 22*b*, and the extending cam part 22*c* are continuously formed in this order from the flexing-side end part 22*bn* toward the extending-side end part 22*ex*. In FIG. 13, the boundary between the flexing cam part 22*a* and the bending cam part 22*b* and the boundary between the bending cam part 22*b* and the extending cam part 22*c* are shown by alternate long and two short dashes lines.

The flexing cam part 22*a* is arranged in the rear of the shank pin 21 and is linearly extended. The flexing cam part 22*a* is extended rearward as it extends upward. Therefore, the flexing cam part 22*a* is formed in such a way that it moves away from the shank pin 21 from the side of the flexing-side end part 22*bn* to the side of the extending-side end part 22*ex*.

The bending cam part 22*b* is arranged above and in the rear of the shank pin 21, and is extended in an arc shape around the center of curvature 22*bc* positioned above the shank pin 21. That is, the bending cam part 22*b* is curved so as to be convex in a direction that it moves away from the shank pin 21, in other words, to be convex upward and rearward. Therefore, the bending cam part 22*b* is formed in such a way that it moves away from the shank pin 21 from the side of the flexing-side end part 22*bn* toward the side of the extending-side end part 22*ex*.

The extending cam part 22*c* is arranged above the shank pin 21 and is linearly extended. The extending cam part 22*c* is extended in the front-back direction. Therefore, the extending cam part 22*c* is made to slightly come close to the shank pin 21 from the side of the flexing-side end part 22*bn* to the side of the extending-side end part 22*ex*, and then it slightly moves away from the shank pin 21.

Referring next to FIGS. 14 to 18, how the shank cam 22, the thigh pin 23, the thigh cam 20, and the shank pin 21 work together in accordance with the knee joint angle will be described.

(Knee Joint Angle: 0 Degrees)

As shown in FIG. 14, when the knee joint angle is 0 degrees, that is, when the knee joint and the outer unit 6 are in the extended state, the shank pin 21 is positioned in the extending-side end part 20*ex* of the thigh cam 20 and the thigh pin 23 is positioned in the extending-side end part 22*ex* of the extending cam part 22*c* of the shank cam 22.

In this manner, when the knee joint angle is 0 degrees, the thigh pin 23 is positioned in the extending cam part 22*c* and the extending cam part 22*c* is extended in the front-back direction. This prevents the thigh pin 23 from moving toward the bending cam part 22*b* of the shank cam 22 due to a ground reaction force that the diseased leg to which the knee brace 2 is attached receives when it contacts the ground. Therefore, when the diseased leg to which the knee brace 2 is attached contacts the ground, the extended state of the knee joint and the outer unit 6 is maintained.

(Knee Joint Angle: 30 Degrees)

Figure 15:
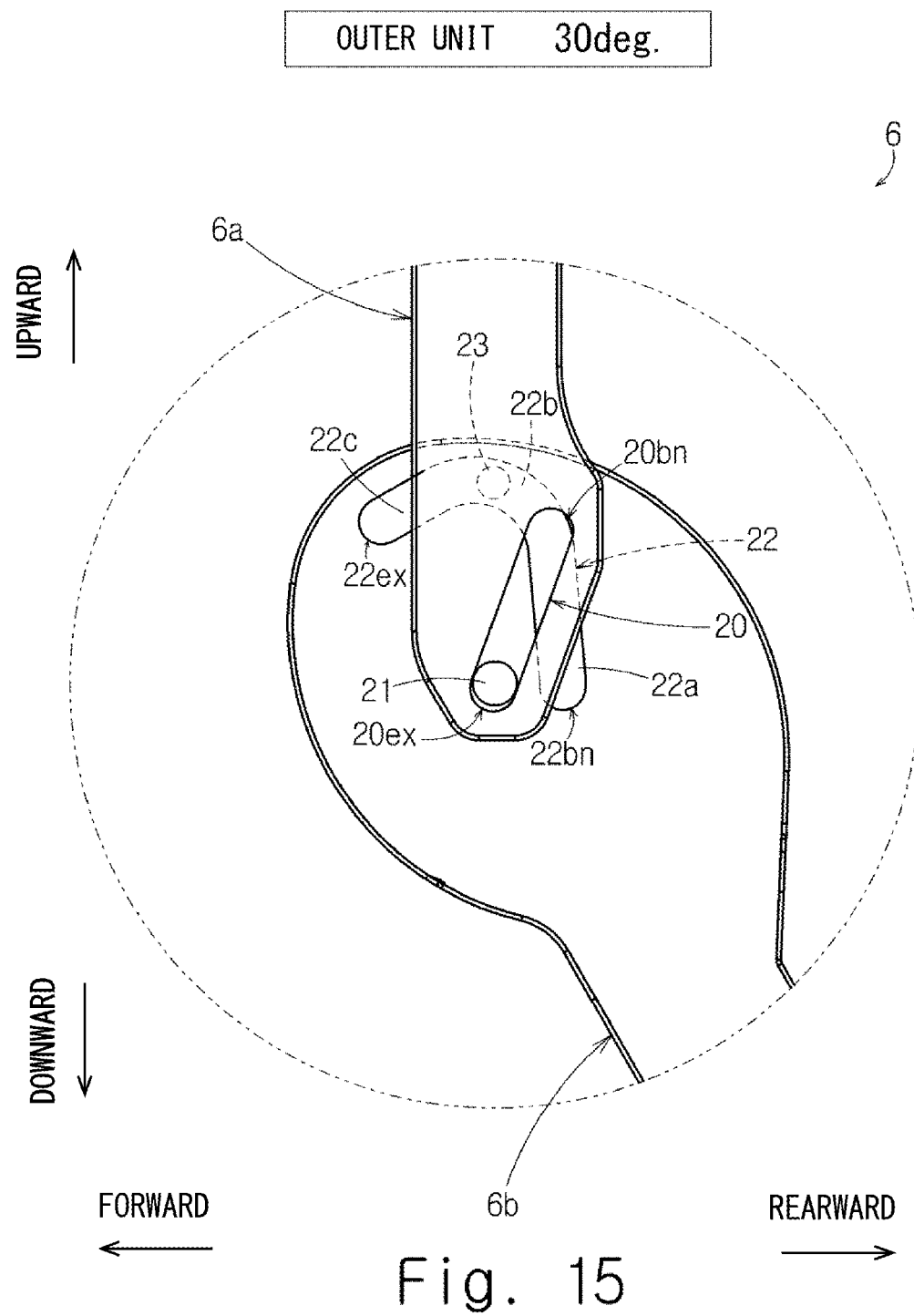
FIG. 15 is a partial side view of the outer unit when the knee joint angle is 30 degrees (second embodiment)

As shown in FIG. 15, when the knee joint angle is 30 degrees, the shank pin 21 is positioned in the extending-side end part 20*ex* of the thigh cam 20 and the thigh pin 23 is positioned in the bending cam part 22*b* of the shank cam 22.

(Knee Joint Angle: 60 Degrees)

Figure 16:
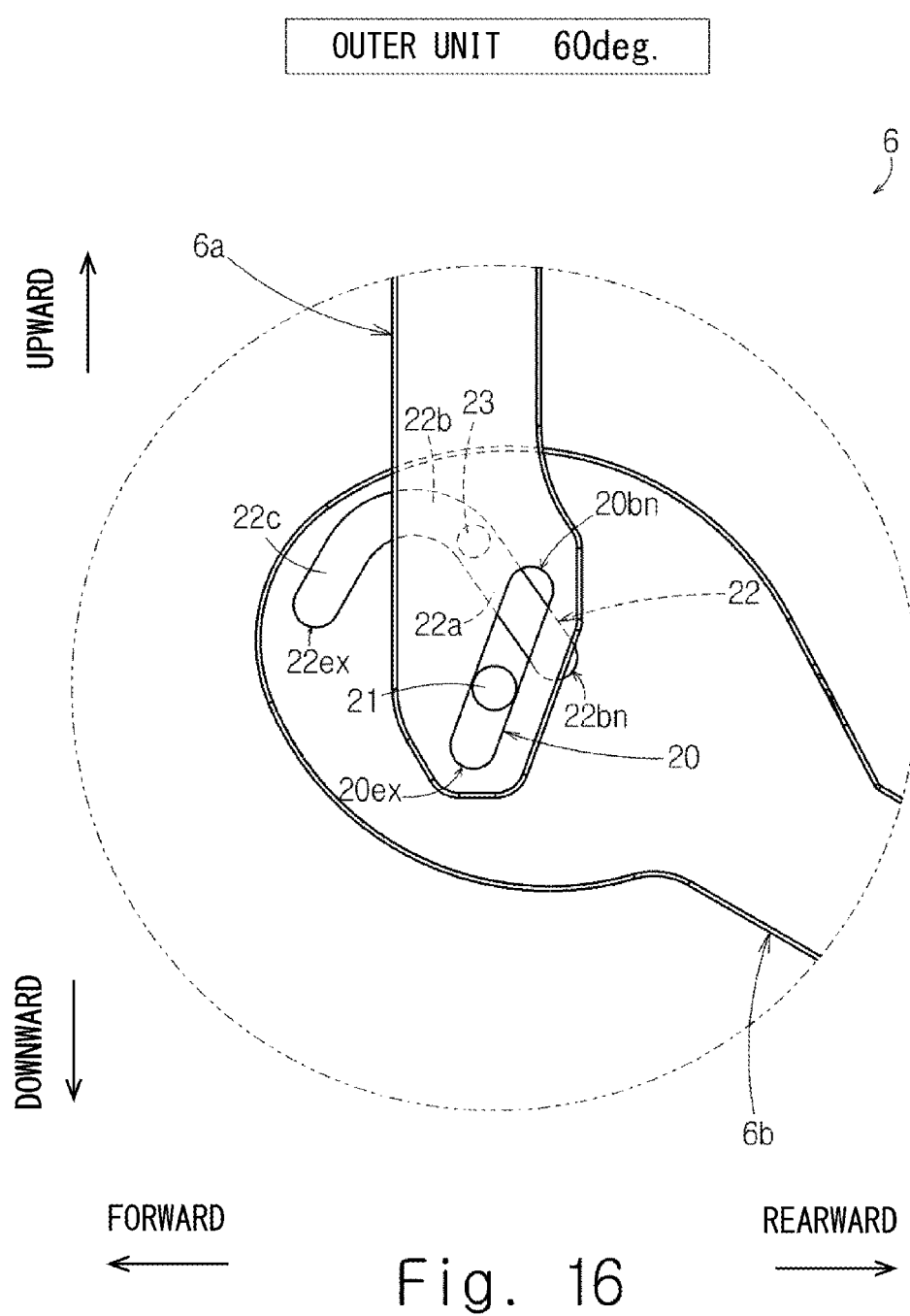
FIG. 16 is a partial side view of the outer unit when the knee joint angle is 60 degrees (second embodiment)

As shown in FIG. 16, when the knee joint angle is 60 degrees, the shank pin 21 is slightly away from the extending-side end part 20*ex* of the thigh cam 20 on the side of the flexing-side end part 20*bn* and the thigh pin 23 is positioned in the boundary between the bending cam part 22*b* and the flexing cam part 22*a* of the shank cam 22.

(Knee Joint Angle: 90 Degrees)

Figure 17:
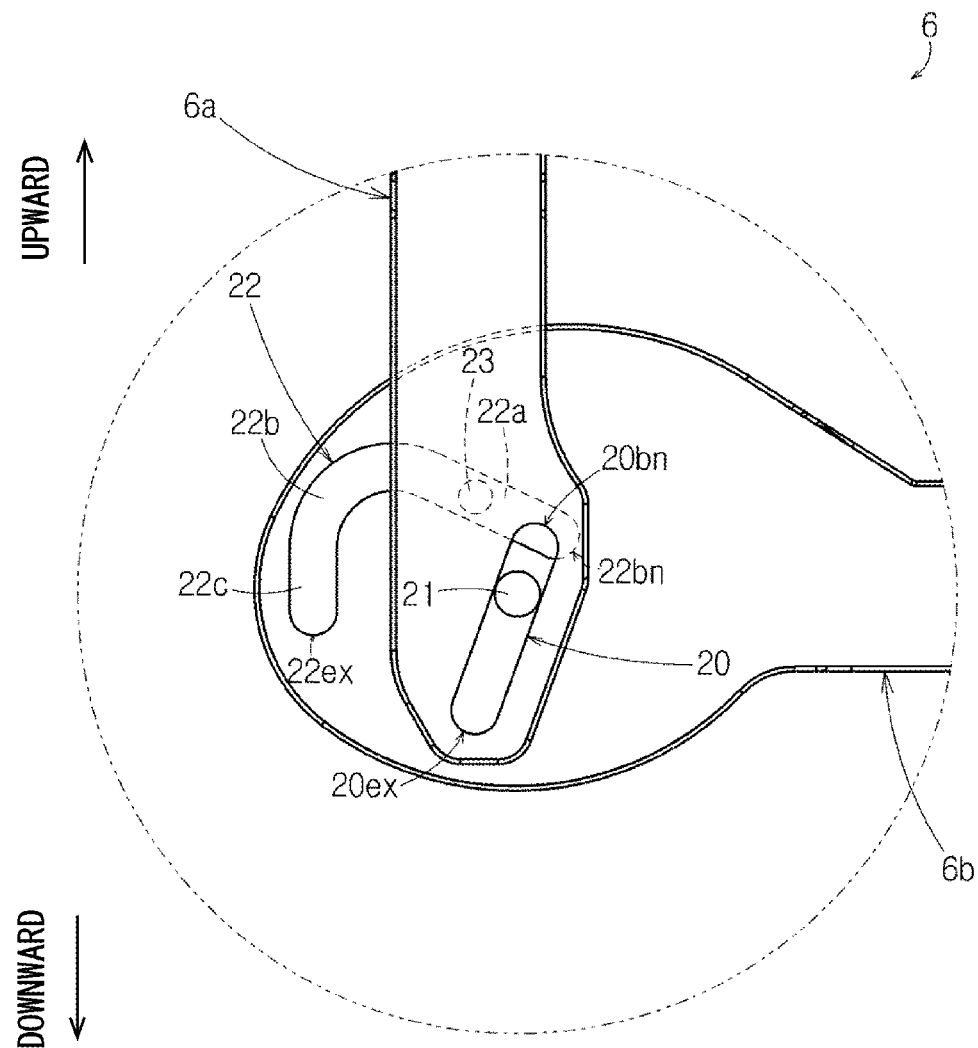
FIG. 17 is a partial side view of the outer unit when the knee joint angle is 90 degrees (second embodiment)

As shown in FIG. 17, when the knee joint angle is 90 degrees, the shank pin 21 is further away from the extending-side end part 20*ex* of the thigh cam 20 on the side of the flexing-side end part 20*bn* and the thigh pin 23 is positioned in the flexing cam part 22*a* of the shank cam 22.

(Knee Joint Angle: 120 Degrees)

Figure 18:
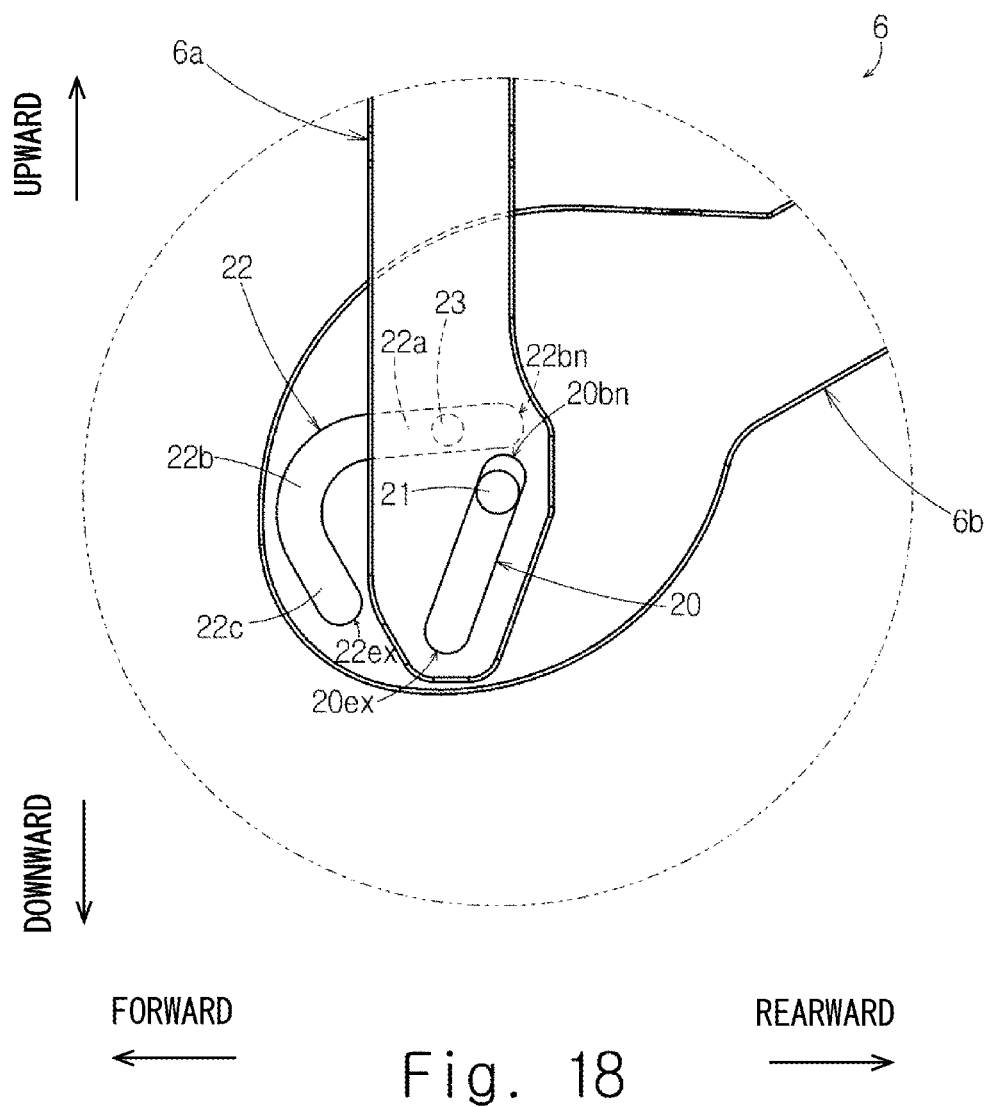
FIG. 18 is a partial side view of the outer unit when the knee joint angle is 120 degrees (second embodiment)

As shown in FIG. 18, when the knee joint angle is 120 degrees, the shank pin 21 is positioned in the flexing-side end part 20*bn* of the thigh cam 20 and the thigh pin 23 is positioned in the vicinity of the flexing-side end part 22*bn* of the flexing cam part 22*a* of the shank cam 22.

(Knee Joint Angle: 120 Degrees→30 Degrees)

While the knee joint is extended and the knee joint angle is changed from 120 degrees to 30 degrees as shown in FIGS. 15 to 18, the thigh pin 23 moves in such a manner that it moves away from the flexing-side end part 22*bn* along the flexing cam part 22*a* and the bending cam part 22*b* of the shank cam 22. On the other hand, the shank cam 22 is formed in such a way that it moves away from the shank pin 21 from the flexing cam part 22*a* of the shank cam 22 toward the bending cam part 22*b*. Therefore, while the knee joint is extended and the knee joint is changed from 120 degrees to 30 degrees as shown in FIGS. 15 to 18, the shank pin 21 is moved from the flexing-side end part 20*bn* of the thigh cam 20 to the extending-side end part 20*ex*. As a result, the shank outer link 6*b* is not only rotated about the shank pin 21 by 30 degrees but also the shank outer link 6*b* moves away from the thigh outer link 6*a* in the longitudinal direction of the shank outer link 6*b* and the shank outer link 6*b* is drawn forward in a direction perpendicular to the longitudinal direction of the shank outer link 6*b* relative to the thigh outer link 6*a* while the knee joint is extended and the knee joint is changed from 120 degrees to 30 degrees. It can also be said that the term "forward" means "in the direction in which the shank L2 of the left leg L is swung when the left leg L is switched from the standing leg state to the idling leg state" or "on the toe side".

Figure 19:
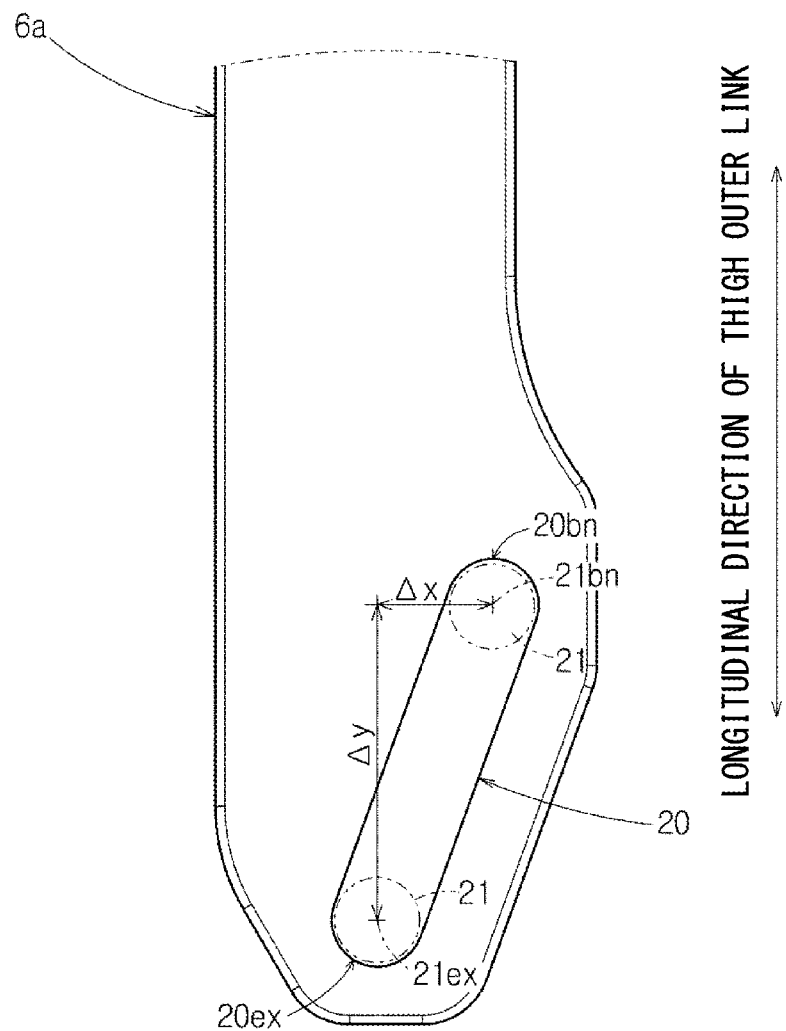
FIG. 19 is a side view of a thigh outer link (second embodiment).

FIG. 19 shows the amount of displacement $\Delta y$ that the shank outer link 6*b* moves away from the thigh outer link 6*a* in the longitudinal direction of the shank outer link 6*b* and the amount of displacement $\Delta x$ that the shank outer link 6*b* is drawn forward in a direction perpendicular to the longitudinal direction of the shank outer link 6*b* relative to the thigh outer link 6*a* while the knee joint is extended and the knee joint is changed from 120 degrees to 30 degrees.

The amount of displacement $\Delta y$ corresponds to the difference between a center point 21*bn* of the shank pin 21 when the shank pin 21 is positioned in the flexing-side end part 20*bn* and a center point 21*ex* of the shank pin 21 when the shank pin 21 is positioned in the extending-side end part 20*ex* in the longitudinal direction of the thigh outer link 6*a*.

On the other hand, the amount of displacement $\Delta x$ corresponds to the difference between the center point 21*bn* of the shank pin 21 when the shank pin 21 is positioned in the flexing-side end part 20*bn* and the center point 21*ex* of the shank pin 21 when the shank pin 21 is positioned in the extending-side end part 20*ex* in the direction that is perpendicular to the longitudinal direction of the thigh outer link 6*a*.

It is seen from FIG. 19 that, by adjusting the inclination angle of the thigh cam 20 with respect to the longitudinal direction of the thigh outer link 6*a*, the ratio of the amount of displacement $\Delta x$ to the amount of displacement $\Delta y$ can be adjusted. Further, by adjusting the length of the thigh cam 20, the amount of displacement $\Delta x$ and the amount of displacement $\Delta y$ can be increased or decreased while maintaining the ratio of the amount of displacement $\Delta x$ to the amount of displacement $\Delta y$.

(Knee Joint Angle: 30 Degrees→0 Degrees)

As shown in FIGS. 14 and 15, while the knee joint is extended and the knee joint angle is changed from 30 degrees to 0 degrees, the thigh pin 23 moves so as to approach the extending-side end part 22*ex* along the extending cam part 22*c* of the shank cam 22. On the other hand, the distance between the extending cam part 22*c* of the shank cam 22 and the shank pin 21 changes little throughout the whole area of the extending cam part 22*c*. Therefore, as shown in FIGS. 14 and 15, while the knee joint is extended and the knee joint angle is changed from 30 degrees to 0 degrees, the shank pin 21 is maintained to be substantially restrained in the extending-side end part 20*ex* of the thigh cam 20. That is, the shank outer link 6*b* is rotated about the shank pin 21 by 30 degrees.

(Inner Unit 7)

Since the structure of the inner unit 7 shown in FIG. 4 is symmetrical to the structure of the outer unit 6 with respect to the midline of the left leg L, the detailed descriptions thereof will be omitted.

In summary, the inner unit 7 is configured as follows. The thigh cam is formed in the thigh inner link 7*a*. The shank pin that is engaged with the thigh cam so that it moves along the thigh cam is formed in the shank inner link 7*b*. The shank cam is formed in the shank inner link 7*b*. The thigh pin that is engaged with the shank cam in such a way that it moves along the shank cam is formed in the thigh inner link 7*a*. The thigh cam is extended forward as it moves away from the thigh attachment part 4. The shank cam is formed in such a way that the shank attachment part moves away from the thigh pin as the knee joint is extended.

According to the aforementioned structure, by just attaching the leg brace 1 to the diseased leg, the movement of intentionally pulling the shinbone downward and forward is achieved when the knee joint is extended. As a result, as shown in FIG. 3, an appropriate gap is formed between the femoral condyle of the femur and the upper joint surface of the shinbone, and the upper joint surface of the shinbone does not physically interfere with the femoral condyle of the femur. As a result, pain in the knee joint that occurs at a time of rehabilitation is relieved.

While the second embodiment has been described above, the second embodiment includes the following features.

As shown in FIG. 13, the thigh cam 20 is formed in the thigh outer link 6*a*. The shank pin 21 that is engaged with the thigh cam 20 so as to move along the thigh cam 20 is formed in the shank outer link 6*b*. The shank cam 22 is formed in the shank outer link 6*b*. The thigh pin 23 that is engaged with the shank cam 22 so as to move along the shank cam 22 is formed in the thigh outer link 6*a*. The thigh cam 20 is extended forward as it moves away from the thigh attachment part 4. The shank cam 22 is formed in such a way that the shank attachment part 5 moves away from the thigh pin 23 as the knee joint is extended. According to the aforementioned structure, the relative movement of the shank outer link 6*b* with respect to the thigh outer link 6*a* described above is achieved with a simple structure.

Further, when it is defined that the knee joint angle when the knee joint is in the extended state is 0 degrees and the knee joint angle increases as the knee joint is flexed, the shank cam 22 is, in embodiments, formed in such a way that the shank attachment part 5 moves away from the thigh pin 23 while the knee joint angle is changed from 90 degrees to 0 degrees. Further specifically, the shank cam 22 is, in embodiments, formed in such a way that the shank attachment part 5 moves away from the thigh pin 23 while the knee joint angle is changed from 60 degrees to 30 degrees. According to the aforementioned structure, the amount of displacement $\Delta y$ increases at the timing when pain occurs when the knee joint with knee joint flexion contracture is extended, whereby it is possible to efficiently relieve this pain.

In the first embodiment, as shown in FIGS. 5 and 12, the thigh cam 10 is formed in such a way that the shank attachment part 5 moves away from the thigh pin 13 in a narrow section where the knee joint is extended and the knee joint angle is changed from 60 degrees to 30 degrees. On the other hand, in this embodiment, as shown in FIGS. 15 to 18, the shank cam 22 is formed in such a way that the shank attachment part 5 moves away from the thigh pin 23 in a wide section where the knee joint is extended and the knee joint angle is changed from 120 degrees to 30 degrees. In this manner, the shank attachment part 5 is formed in such a way that it gradually moves away from the thigh pin 23 when the knee joint is extended, whereby it is expected to reduce anxiety of users who use the leg brace 1 for the first time.

(Supplementary Note 1)

A knee brace comprising:
a thigh attachment part that is attached to a thigh of a user;
a shank attachment part that is attached to a shank of the user;
an outer unit that couples the thigh attachment part to the shank attachment part and is arranged on an outer (lateral) side of a lower limb of the user; and
an inner unit that couples the thigh attachment part to the shank attachment part and is arranged on an inner (medial) side of the lower limb of the user, wherein
the outer unit comprises:
a thigh outer link that is extended along the thigh and is fixed to the thigh by the thigh attachment part; and
a shank outer link that is extended along the shank and is fixed to the thigh by the thigh attachment part,
the thigh outer link and the shank outer link are rotatably coupled to each other on the outer side of the knee joint of the user,
the inner unit comprises:
a thigh inner link that is extended along the thigh and is fixed to the thigh by the thigh attachment part; and
a shank inner link that is extended along the shank and is fixed to the thigh by the thigh attachment part,
the thigh inner link and the shank inner link are rotatably coupled to each other on the inner side of the knee joint of the user, and are configured in such a way that the shank outer link moves away from the thigh outer link in the longitudinal direction of the shank outer link and the shank outer link is drawn forward in the direction perpendicular to the longitudinal direction of the shank outer link relative to the thigh outer link, and the shank inner link moves away from the thigh inner link in the longitudinal direction of the shank inner link and the shank inner link is pushed rearward in the direction perpendicular to the longitudinal direction of the shank inner link relative to the thigh inner link as the knee joint of the user is flexed.

(Supplementary Note 2)

The knee brace according to Supplementary Note 1, wherein
a thigh cam is formed in the thigh outer link,
a shank pin that is engaged with the thigh cam in such a way that the shank pin moves along the thigh cam is formed in the shank outer link,
a shank cam is formed in the shank outer link,
a thigh pin that is engaged with the shank cam in such a way that the thigh pin moves along the shank cam is formed in the thigh outer link,
the shank cam is extended rearward as it moves away from the shank attachment part, and
the thigh cam is formed in such a way that the shank attachment part moves away from the thigh pin as the knee joint is flexed.

(Supplementary Note 3)

The knee brace according to Supplementary Note 1, wherein
a thigh cam is formed in the thigh inner link,
a shank pin that is engaged with the thigh cam in such a way that the shank pin moves along the thigh cam is formed in the shank inner link,
a shank cam is formed in the shank inner link,
a thigh pin that is engaged with the shank cam in such a way that the thigh pin moves along the shank cam is formed in the thigh inner link,
the shank cam is extended forward as it moves away from the shank attachment part, and
the thigh cam is formed in such a way that the shank attachment part moves away from the thigh pin as the knee joint is flexed.

(Supplementary Note 4)

The knee brace according to Supplementary Note 1, wherein
a thigh cam is formed in the thigh outer link,
a shank pin that is engaged with the thigh cam in such a way that the shank pin moves along the thigh cam is formed in the shank outer link,
a shank cam is formed in the shank outer link,
a thigh pin that is engaged with the shank cam in such a way that the thigh pin moves along the shank cam is formed in the thigh outer link,
the thigh cam is extended forward as it moves away from the thigh attachment part, and
the shank cam is formed in such a way that the shank attachment part moves away from the thigh pin as the knee joint is flexed.

(Supplementary Note 5)

The knee brace according to Supplementary Note 1, wherein
a thigh cam is formed in the thigh inner link,
a shank pin that is engaged with the thigh cam in such a way that the shank pin moves along the thigh cam is formed in the shank inner link,
a shank cam is formed in the shank inner link,
a thigh pin that is engaged with the shank cam in such a way that the thigh pin moves along the shank cam is formed in the thigh inner link,
the thigh cam is extended rearward as it moves away from the thigh attachment part, and
the shank cam is formed in such a way that the shank attachment part moves away from the thigh pin as the knee joint is flexed.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A knee brace comprising:
a thigh attachment part that is configured to be attached to a thigh of a user;
a shank attachment part that is configured to be attached to a shank of the user;
an outer unit that couples the thigh attachment part to the shank attachment part and is configured to be arranged on an outer side of a lower limb of the user;
an inner unit that couples the thigh attachment part to the shank attachment part and is configured to be arranged on an inner side of the lower limb of the user, wherein
the outer unit comprises:
a thigh outer link that is configured to extend along the thigh and is fixed to the thigh by the thigh attachment part; and
a shank outer link that is configured to extend along the shank and is fixed to the shank by the shank attachment part, the thigh outer link and the shank outer link are rotatably coupled to each other configured on the outer side of a knee joint of the user, the inner unit comprises:
a thigh inner link that is configured to extend along the thigh and is fixed to the thigh by the thigh attachment part; and
a shank inner link that is configured to extend along the shank and is fixed to the shank by the shank attachment part;
a thigh cam is formed in the thigh outer link,
a shank pin that is engaged with the thigh cam in such a way that the shank pin moves along the thigh cam is formed in the shank outer link,
a shank cam is formed in the shank outer link,
a thigh pin that is engaged with the shank cam in such a way that the thigh pin moves along the shank cam is formed in the thigh outer link,
the shank cam is extended rearward as it moves away from the shank attachment part, and
the thigh cam is formed in such a way that the shank attachment part moves away from the thigh pin as the knee joint is extended,
wherein the shank cam extends curved in a U-shape and includes a flexing cam part, a bending cam part, and an extending cam part, the flexing cam part is arranged in a rear of the shank pin and is linearly extended in a rearward direction as it extends in an upward direction, the bending cam part is arranged above and in the rear of the shank pin, and is extended in an arc shape around a center of curvature positioned above the shank pin, and the extending cam part is arranged above the shank pin and is linearly extended in a front-back direction, and
the thigh inner link and the shank inner link are rotatably coupled to each other configured on the inner side of the knee joint of the user, and the outer unit and the inner unit are configured in such a way that the shank outer link moves away from the thigh outer link in a longitudinal direction of the shank outer link and the shank outer link is drawn forward in a direction perpendicular to the longitudinal direction of the shank outer link relative to the thigh outer link, and the shank inner link moves away from the thigh inner link in the longitudinal direction of the shank inner link and the shank inner link is drawn forward in the direction perpendicular to the longitudinal direction of the shank inner link relative to the thigh inner link as the knee joint of the user is extended.

2. The knee brace according to claim 1, wherein
a second thigh cam is formed in the thigh inner link,
a second shank pin that is engaged with the second thigh cam in such a way that the second shank pin moves along the second thigh cam is formed in the shank inner link,
a second shank cam is formed in the shank inner link,
a second thigh pin that is engaged with the second shank cam in such a way that the second thigh pin moves along the second shank cam is formed in the thigh inner link,
the second shank cam is extended rearward as it moves away from the shank attachment part, and
the second thigh cam is formed in such a way that the shank attachment part moves away from the second thigh pin as the knee joint is extended.

3. The knee brace according to claim 2, wherein
when it is defined that a knee joint angle is when the knee joint is in an extended state is 0 degrees and the knee joint angle increases as the knee joint is flexed,
the second thigh cam is formed in such a way that the shank attachment part moves away from the second thigh pin while the knee joint angle is changed from 90 degrees to 0 degrees.

4. The knee brace according to claim 3, wherein the second thigh cam is formed in such a way that the shank attachment part moves away from the second thigh pin while the knee joint angle is changed from 60 degrees to 30 degrees.

5. The knee brace according to claim 1, wherein
the thigh cam is extended forward as it moves away from the thigh attachment part, and
the shank cam is formed in such a way that the shank attachment part moves away from the thigh pin as the knee joint is extended.

6. The knee brace according to claim 5, wherein
when it is defined that a knee joint angle is when the knee joint is in an extended state is 0 degrees and the knee joint angle increases as the knee joint is flexed,
the shank cam is formed in such a way that the shank attachment part moves away from the thigh pin while the knee joint angle is changed from 90 degrees to 0 degrees.

7. The knee brace according to claim 6, wherein the shank cam is formed in such a way that the shank attachment part moves away from the thigh pin while the knee joint angle is changed from 60 degrees to 30 degrees.

8. The knee brace according to claim 1, wherein
a second thigh cam is formed in the thigh inner link,
a second shank pin that is engaged with the second thigh cam in such a way that the second shank pin moves along the second thigh cam is formed in the shank inner link,
a second shank cam is formed in the shank inner link,
a second thigh pin that is engaged with the second shank cam in such a way that the second thigh pin moves along the second shank cam is formed in the thigh inner link,
the second thigh cam is extended forward as it moves away from the thigh attachment part, and
the second shank cam is formed in such a way that the shank attachment part moves away from the second thigh pin as the knee joint is extended.

9. The knee brace according to claim 8, wherein
when it is defined that a knee joint angle is when the knee joint is in an extended state is 0 degrees and the knee joint angle increases as the knee joint is flexed,
the second shank cam is formed in such a way that the shank attachment part moves away from the second thigh pin while the knee joint angle is changed from 90 degrees to 0 degrees.

10. The knee brace according to claim 9, wherein the second shank cam is formed in such a way that the shank attachment part moves away from the second thigh pin while the knee joint angle is changed from 60 degrees to 30 degrees.

11. The knee brace according to claim 1, wherein
when it is defined that a knee joint angle is when the knee joint is in an extended state is 0 degrees and the knee joint angle increases as the knee joint is flexed,
the thigh cam is formed in such a way that the shank attachment part moves away from the thigh pin while the knee joint angle is changed from 90 degrees to 0 degrees.

12. The knee brace according to claim 11, wherein the thigh cam is formed in such a way that the shank attachment part moves away from the thigh pin while the knee joint angle is changed from 60 degrees to 30 degrees.

13. A leg brace comprising the knee brace according to claim 1.

* * * * *